(12) United States Patent
Kubota

(10) Patent No.: US 7,415,166 B2
(45) Date of Patent: Aug. 19, 2008

(54) IMAGE PROCESSING DEVICE

(75) Inventor: Akihiro Kubota, Kokubunji (JP)

(73) Assignee: Olympus Corporation, Tokyo (JP)

( * ) Notice: Subject to any disclaimer, the term of this patent is extended or adjusted under 35 U.S.C. 154(b) by 689 days.

(21) Appl. No.: 10/980,460

(22) Filed: Nov. 3, 2004

(65) Prior Publication Data

US 2005/0093886 A1 May 5, 2005

(30) Foreign Application Priority Data

Nov. 4, 2003 (JP) ............................. 2003-374928

(51) Int. Cl.
*G06K 9/36* (2006.01)
*G06K 9/32* (2006.01)
*G06K 9/34* (2006.01)

(52) U.S. Cl. ..................... 382/284; 382/294; 382/299

(58) Field of Classification Search ................. 382/284, 382/291, 292, 294, 299, 298, 282, 283, 173, 382/180; 358/540, 537, 538; 345/629, 630, 345/620, 621, 660
See application file for complete search history.

(56) References Cited

U.S. PATENT DOCUMENTS 7,209,149 B2 * 4/2007 Jogo ........................ 345/622
7,254,280 B2 * 8/2007 Kagle et al. ................. 382/284

FOREIGN PATENT DOCUMENTS

| JP | 63-185284 | 7/1988 |
| JP | 08-331452 | 12/1996 |
| JP | 09-051444 | 2/1997 |
| JP | 10-336494 | 12/1998 |

OTHER PUBLICATIONS

The Journal of the Institute of Television Engineers of Japan, pp. 1418-1419, vol. 48, No. 11 (1994).

* cited by examiner

*Primary Examiner*—Yon Couso
(74) *Attorney, Agent, or Firm*—Volpe and Koenig, P.C.

(57) ABSTRACT

Provided is an image processing device, including a division area setting unit for dividing and cutting out a plurality of image areas from a single image; and a synthesizing unit for synthesizing into a single image the plurality of image areas divided and cut out with the division area setting unit. By cutting out several arbitrary image areas from the same image output of a single camera and synthesizing and outputting the cutout portion, variations that arise among cameras in a case where several cameras are used will not occur. Further, an image processing unit for performing individual image processing on the plurality of divided and cut out image areas may be further provided, and the synthesizing unit may be used to synthesize the images subjected to individual image processing into a single image.

13 Claims, 16 Drawing Sheets

FIG.3

| 8 B 4.5 | 8 A 9 |
|---|---|
| | C 4.5 |

FIG.4

| 8 A 4.5 | 8 B |
|---|---|
| C 4.5 | D |

FIG.5

| 4 B | C | D | 4 E |
|---|---|---|---|
| 12 A 6.75 | | | 4 F |
| | | | 4 G |
| | | | 4 H |

2.25  2.25  2.25  2.25

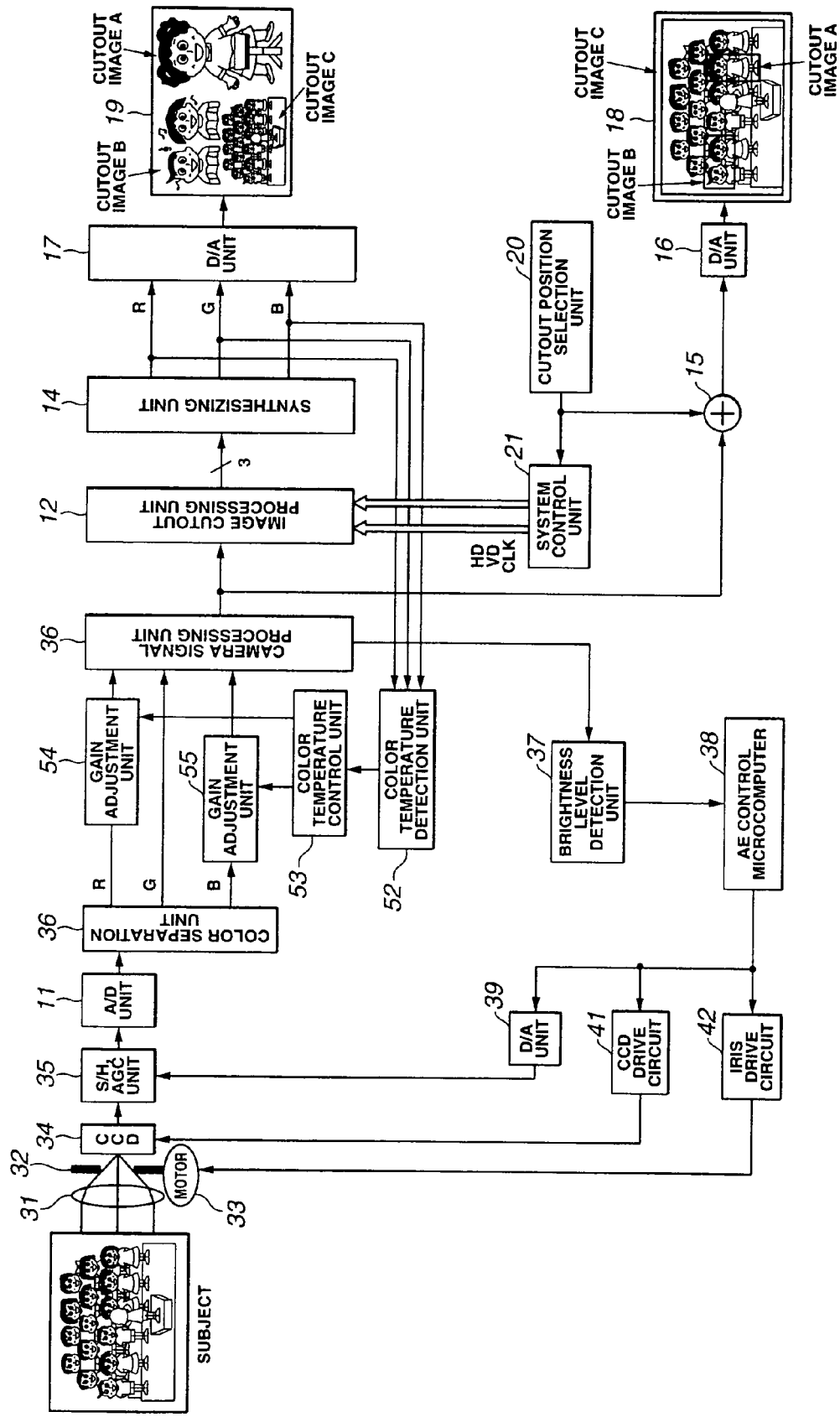

IMAGE PROCESSING DEVICE

This application claims benefit of Japanese Application No. 2003-374928 filed on Nov. 4, 2003 in Japan, the entire contents of which are hereby incorporated by reference.

BACKGROUND OF THE INVENTION

The present invention relates to an image processing device enabling the user to cut out and synthesize desired arbitrary images among the picked-up images.

In recent years, as the miniaturization of image pickup elements such as CCD and the like steps ahead, minute display or recording becomes possible even when a part of the image area is cut out. For instance, the specification of Japanese Patent No. 2557865 proposes a device for appropriately reading out image pickup information from the center area of the image pickup element.

A system of taking photos with a plurality of cameras and synthesizing and outputting the respective photos is conventionally known from the specification of Japanese Patent No. 3234851, the Journal of the Institute of Television Engineers of Japan, Vol. 48, No. 11, p1418-1419, and so on.

SUMMARY OF THE INVENTION

The image processing device according to the present invention has a division area setting unit for dividing and cutting out a plurality of image areas from a single image, and a synthesizing unit for synthesizing into a single image the plurality of image areas divided and cut out with the division area setting unit.

BRIEF DESCRIPTION OF THE DRAWINGS

FIG. 3 is a diagram showing an example of the display pattern of a plurality of cutout images on the synthesized image display device;

FIG. 4 is a diagram showing another example of the display pattern of a plurality of cutout images on the synthesized image display device;

FIG. 5 is a diagram showing still another example of the display pattern of a plurality of cutout images on the synthesized image display device;

FIG. 19 is a block diagram of the image processing device according to a twelfth embodiment of the present invention.

DETAILED DESCRIPTION OF THE PREFERRED EMBODIMENTS

The respective embodiments of the present invention are now explained with reference to FIG. 1 to FIG. 19. The respective embodiments of the present invention will be explained regarding an image processing device in an image pickup device such as a digital camera and digital video camera. The respective embodiments relate to an image processing device capable of cutting out and synthesizing, in real time, desired arbitrary images among the taken images.

First Embodiment

Figure 1:
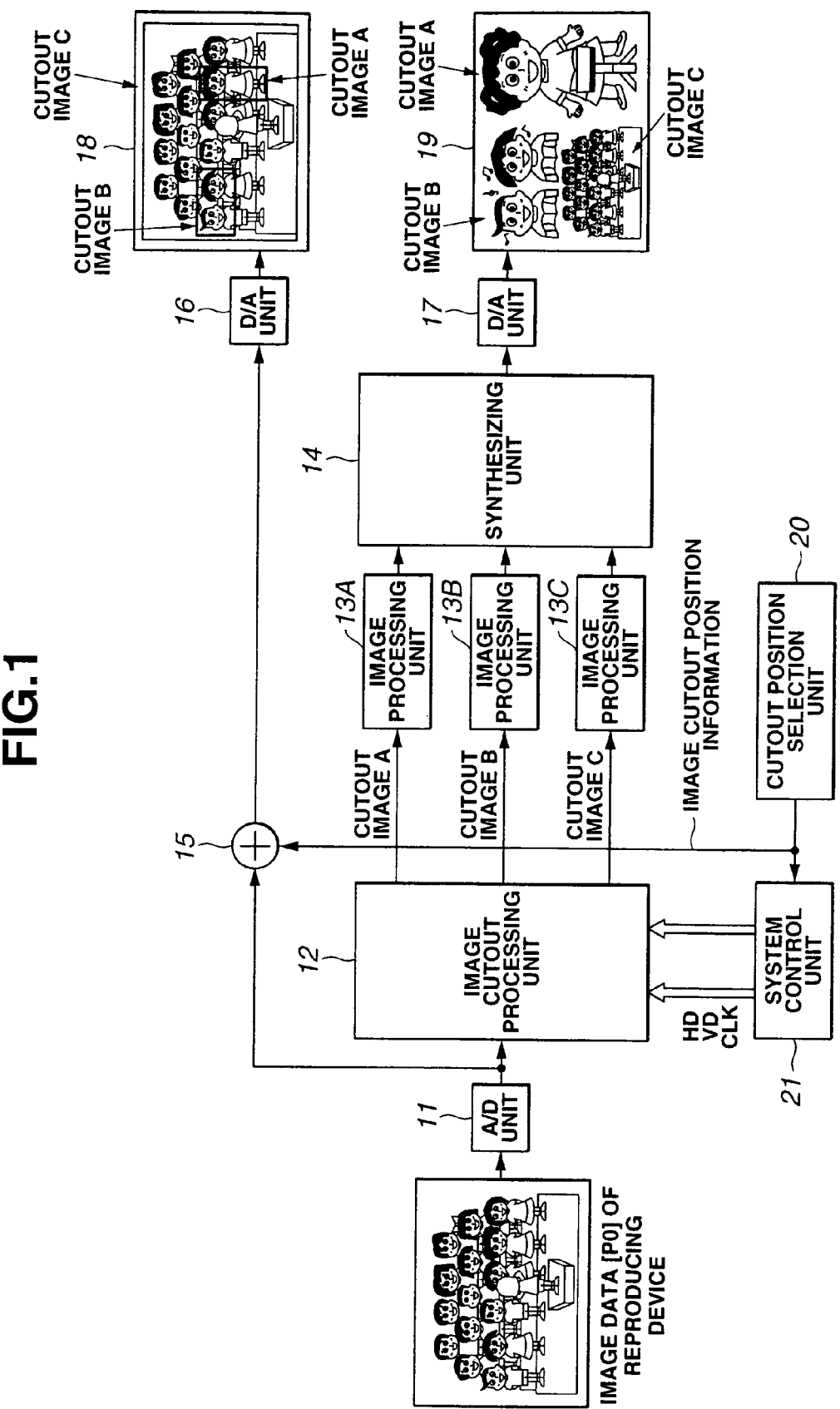
FIG. 1 is a block diagram of the image processing device according to a first embodiment of the present invention.

FIG. 1 is a block diagram of the image processing device according to the first embodiment of the present invention.

In FIG. 1, the image processing device comprises an analog/digital conversion unit (hereinafter referred to as the A/D unit, provided that this A/D unit is not necessary when the reproducing device is compatible to digital image output) 11 for digitizing an image signal P0 input from the reproducing device; an image cutout processing unit 12 for inputting a digital image signal and creating a plurality of cutout images A, B and C (3 in the drawing) designated by the user from the digital image; image processing units 13A, 13B and 13C for individually performing image processing on the respective cutout images A, B and C; a synthesizing unit 14 for synthesizing the cutout images subjected to individual image processing into a single image; an adder 15 for adding the overall image and the cutout area display (mark) selected with the user's operation; a digital/analog conversion unit (hereinafter referred to as the D/A unit) 16 for converting the overall image data into analog data; an overall image display device 18 for displaying the overall taken image; a synthesized image display device 19 for displaying the synthesized image resulting from the synthesis of a plurality of cutout images; a cutout position selection unit 20 for designating the position of the cutout image on the screen of the overall image display device 18; and a system control unit 21 for creating a cutout image by controlling the image cutout processing unit 12 based on the image position cutout information from the cutout position selection unit 20, the horizontal synchronizing signal (HD) and vertical synchronizing signal (VD), and clock signal.

Incidentally, the overall image display device 18 for showing the cutout area and the synthesized image display device 19 for displaying the synthesized image may respectively be separate display devices, or a user may switch a single display device by switching it with a switching device not shown for use both as a device for displaying the overall image and the synthesized image.

In the foregoing constitution, after cutting out a plurality of arbitrary image areas with the image cutout processing unit from the same image output of a single reproducing device, necessary image processing (brightness correction for example) is performed on the plurality of cutout images A, B and C with the individual image processing units 13A, 13B and 13C, and these are synthesized and output with the synthesizing unit 14. The image cutout processing unit 12 constitutes division area setting means for dividing and cutting out a plurality of image areas, and the synthesizing unit 14 constitutes synthesizing means for synthesizing the plurality of divided and cut out image areas into a single image.

Thereby, the foregoing problems that arise when using a plurality of cameras can be overcome; that is, there are no variations in the color, brightness or geometric adjustment among the cameras, and, by performing the necessary corrections individually to the plurality of cut out image areas, a more favorable synthesized image can be created. Further, needless to say, this is much more cost effective in comparison to using a plurality of cameras.

The cutout image selection unit 20 is for creating cutout position information of the image area arbitrarily selected by a user with pointing means such as a mouse not shown, and designates the cutout starting position (H:x1pix,V:y1pix) and ending position (H:x2pix, V:y2pix) within a single image.

The system control unit 21 controls the timing of the output (reading) of the buffer memory inside the image cutout processing unit 12 based on the clock, HD and VD signal, and cuts out (i.e. reads out) image data within the buffer memory based on the cutout position information from the cutout position selection unit 20. Incidentally, since the clock, HD and VD signals of the system control unit 21 function as a so-called scan converter, so as long as the input/output timing is the same, there is no need to control the timing from the system control unit 21 because the clock, HD and VD signals of the input signal may be used.

The user may designate the cutout image by using a mouse or the like to move the pointer to a starting point of the portion to be cut out on the overall image display unit 18 and pressing the button on the mouse, and, by releasing the button at the ending point, a box-shaped frame will be displayed, and the area inside such box-shaped frame will be selected. Pursuant to the frame display in FIG. 1, for instance, cutout image A will be extracted. Cutout images B and C are similarly extracted.

And, these cutout images A, B and C are displayed on the screen of the synthesized image display device 19 in accordance with the display arrangement predetermined with the synthesizing unit 14 or the like. Thereafter, when a mouse or the like is used to move the pointer to the corner of image A on the display device 19 and the left button of the mouse is pressed, and, when the pointer of the mouse is moved (dragged) in such a state in and out of the image, the display size of image A will change simultaneously, and the size of the image is determined by releasing the left button of the mouse. Next, when the mouse is moved inside image A and the left button is pressed and the pointer of the mouse is moved (dragged) in such a state, the position of image A will move simultaneously. The position of the image is determined by releasing the left button of the mouse. Cutout images B, C, . . . are sequentially subjected to a similar operation. However, the display area of cutout image B on the display device 19 will be an area outside the display area of cutout image A, the display area of cutout image C will be an area outside the areas of cutout images A and B, and so on. In other words, the display area determined first will have preference over the display area determined subsequently.

Subsequent image processing units 13A, 13B and 13C are for performing image processing for each cutout image A, B and C, and, for instance, performs signal level detection for each cutout image and performs level correction to the cutout image such that the signal level becomes adequate. Thereafter, the respective cutout images are synthesized with the synthesizing unit 14 into a single image, which is D/A converted with the D/A unit 17, and displayed on the synthesized image display device 19.

Figure 2:
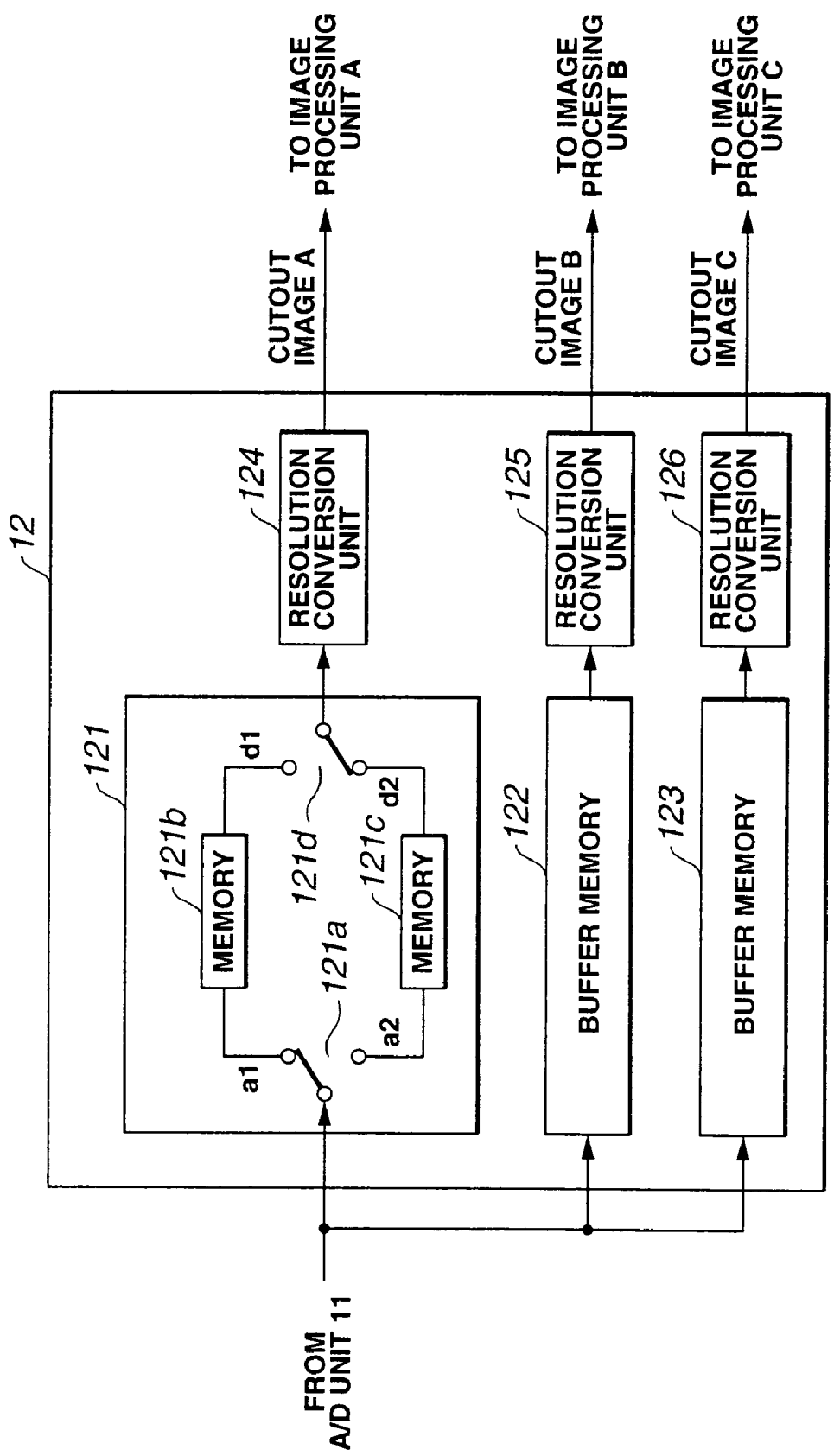
FIG. 2 is a block diagram showing an example of the constitution of the image cutout processing unit depicted in FIG. 1.

FIG. 2 shows an example of the constitution of the image cutting processing unit 12 illustrated in FIG. 1. A case is explained where there are three cutout images.

The image cutout processing unit 12 depicted in FIG. 2 comprises a plurality of image cutout frame buffer memories 121, 122 and 123 (3 in FIG. 2) for storing image data from the A/D unit 11, and resolution conversion units 124, 125 and 126 for enlarging or reducing the respective cutout images to a predetermined display size from the frame buffer memories 121, 122 and 123, and outputting the same.

Each of the frame buffer memories 121, 122 and 123 is constituted by comprising two frame memories 121b and 121c for providing two frames' worth of storage area per cutout image, and switches 121a and 121b respectively provided to the input/output side of the two frame memories 121b and 121c, which alternately switch in frame cycles, and alternately performs writing and reading to the two frame memories 121b and 121c.

The resolution conversion units 124, 125 and 126 are processing units for enlarging or reducing the cutout size of the selected area cut out based on the cutout position information (designation) from the foregoing buffer memories, and the conversion ratio of the size is determined based on the ratio of the cutout size and display size. When reducing the cutout image, processing may be performed with pixel skipping, and, when enlarging the cutout image, processing may be performed with simple interpolation or linear interpolation. Details on this enlargement are described in the gazette of Japanese Patent Laid-Open Publication No. H10-336494 and other documents.

Next, the operation of FIG. 2 is explained briefly. The flow of the image data, after being digitized with the A/D unit 11, is stored in the three image cutout buffer memories 121, 122 and 123 of the image cutout processing unit 12.

As shown in FIG. 2, the operation of this buffer memory 121 is of a constitution which, after storing one frame worth of image data to one frame memory 121b, stores the subsequent frame to the other frame memory 121c, cuts out the arbitrary portion (portion designated to be cut out) from the image data of the first frame stored in the frame memory 121b based on the cutout position information, and simultaneously stored in the frame memory 121c, and outputs this to the resolution conversion unit 124 as the cutout image.

The switches 121a and 121d are alternately switched in the timing of a frame cycle. In other words, while a terminal a1 of the switch 121a is selected and writing of the frame data in the memory 121b is being performed, a terminal d2 of the switch 121d is selected and the stored image data of the memory 121c is read out, and, while a terminal a2 of the switch 121a is selected and writing of the frame data in the memory 121c is being performed, a terminal d1 of the switch 121d is selected and the stored image data of the memory 121b is read out.

The resolution conversion units 124, 125 and 126 are for performing resolution conversion for converting the resolution of the cut out image into a resolution for display on the synthesized image display device 19. According to the resolution conversion processing, upon synthesizing and displaying the cutout image on the synthesized image display unit 19, the resolution of the cutout image is converted into a resolution conforming to the size of the cutout image to be displayed on the synthesized image display device 19. In other words, cutout images A, B and C are respectively subjected to resolution conversion and the respective cutout images will become an appropriate display resolution as a result thereof. When synthesizing and displaying the cutout images on the screen of the synthesized image display device 19, since each cutout image will be displayed by being enlarged or reduced to a predetermined size in a predetermined area, for instance, on the screen of the synthesized image display device 19, by performing further smoothing processing through the comparison of the resolution of the cutout image and the resolution of the display image thereof and enlargement or reduction of the image by performing resolution conversion in accordance with the ratio thereof, it is possible to prevent the cutout image from becoming more grainy.

Incidentally, when using a high resolution camera of 5 million pixels or 8 million pixels, upon enlarging the image, pixel interpolation can be avoided by employing the pixels (these pixels are stored in the buffer memories 121, 122 and 123) that are not used in the actual display on the display device prior to enlargement. In other words, this applies to a case where the synthesized image display device 19 of the camera is able to display images by employing unused pixels. Here, pixel interpolation will not be required upon enlarging the image.

Meanwhile, when a cutout area is arbitrarily determined on the overall image display device 18 in pixel units, it is highly likely that gaps will arise in the display screen of the synthesized image display device 19, and the enlargement/reduction processing will become complex upon performing resolution conversion from the cutout image to the display image on the synthesized screen. Thus, the display screen is divided into a plurality of display areas without any gaps in a predetermined aspect ratio according to the screen aspect ratio of the synthesized image display device 19, and the cutout size is determined in a state of maintaining the aspect ratio of the respective divided sizes. In other words, the system control unit 21 determines the size of each image such that a single synthesized image without any gaps can be obtained when arranging the respective images upon synthesizing and displaying the plurality of cutout images in accordance with the image aspect ratio.

For example, when the screen aspect ratio is 16:9, the image is divided in a predetermined aspect ratio, the minimum unit is made to be 4:2.25 for instance, and the respective cutout images are determined thereby.

FIG. 3 is a diagram showing the case where cutout image A=8:9, where cutout image B=8:4.5, and where cutout image C=8:4.5; FIG. 4 is a diagram showing the case where cutout images A, B, C and D=8:4.5; and FIG. 5 is a diagram showing the case where cutout image A=12:6.75, and where cutout images B, C, D, E, F, G and H=4:2.25.

The operation is now explained with reference to FIG. 3.

Foremost, cutout images A, B and C of an arbitrary size having the respective aspect ratios of the cutout images A, B and C of the display pattern illustrated in FIG. 3 are designated on the overall image display device 18.

Next, in order to determine the cutout image area of cutout image A, the user presses the mouse button at the starting point of the cutout and moves the mouse to the ending point. Here, the cutout area is set while maintaining the relationship of the horizontal and vertical aspect ratio of 8:9.

Next, in order to determine the respective cutout image areas of cutout images B and C, the respective cutout areas are set while maintaining the relationship of the horizontal and vertical aspect ratio of 8:4.5.

Pursuant to the cutout setting method in the overall image display device 18 described above, a synthesized image coinciding with the display pattern illustrated in FIG. 3 may be displayed on the synthesized image display device 19. The same applies to the cutout setting depicted in FIG. 4 and FIG. 5.

Second Embodiment

Figure 6:
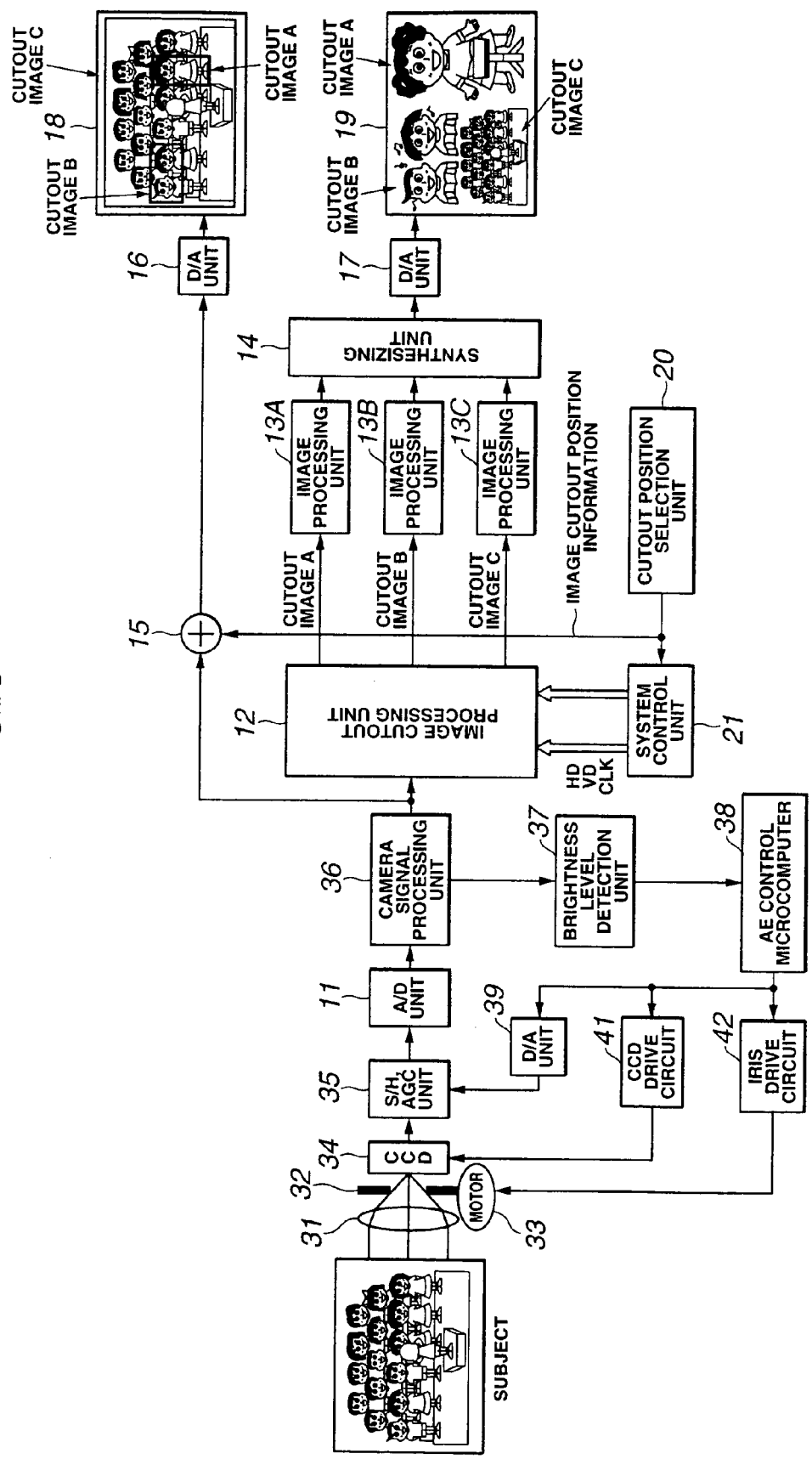
FIG. 6 is a block diagram of the image processing device according to a second embodiment of the present invention.

FIG. 6 is a block diagram of the image processing device pertaining the second embodiment of the present invention. This embodiment aims to correct the level of brightness (exposure).

To explain the constitution along the flow of the signal, the image processing device of the present embodiment comprises a camera optical lens 31, an iris (aperture) 32 in which the amount of exposure is controlled with a motor 33, a CCD 34 which is an image pickup element, having a Bayer arrangement filter layered, for converting light into an electrical signal, a S/H, AGC unit 35 for performing sample hold (hereinafter referred to as S/H) processing on the CCD signal and AGC-adjusting the signal level thereof, an A/D unit 11 for converting this into a digital signal, a camera signal processing unit 36 for performing color adjustment and other signal processing, and an automatic exposure (AE) control system (37, 38, 39, 41 and 42). The components from the image cutout processing unit 12 onward are the same as those illustrated in FIG. 1.

The AE control system has a brightness level detection unit 37 for detecting the brightness level, an AE control microcomputer 38 having an AE processing method program pursuant to the brightness level built therein, a D/A unit 39 for analog-converting the digital brightness signal from the AE control microcomputer 38 into an AGC control signal, a CCD drive circuit 41 for controlling the CCD operation such as the electronic shutter speed based on the instructions from the AE control microcomputer 38, and an iris drive circuit 42 for driving the iris control motor 33 based on the instructions from the AE control microcomputer 38.

Next, the operation is now explained.

Signal processing of the overall image is performed, the brightness level is detected, and brightness is adjusted thereby. This may be performed by a conventional method; that is, by integrating the brightness value of the overall screen and adjusting the iris 32, adjusting the electronic shutter speed of the image pickup element 34, or adjusting the gain of the amplifier inside the S/H, AGC unit 35 independently or in combination so as to attain a constant, whereby the appropriate brightness level (exposure) of the overall screen can be obtained.

Figures 7, 8:
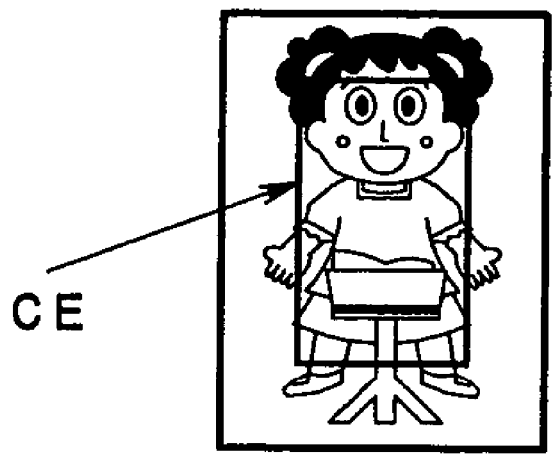
FIG. 7 is an explanatory diagram for explaining the center weighted method.
FIG. 8 is another explanatory diagram for explaining the center weighted method.

Further, in addition to determining the average brightness of the overall screen, a center weighted method may be employed and, as shown in FIG. 7, the average brightness value may be determined by placing emphasis on the data of the center weighted area CA (c.f. FIG. 8) in relation to the peripheral portion of the overall screen.

Next, as with the first embodiment, after performing the cutout processing in the image cutout processing unit 12, image processing (integrating the brightness value, for example) is performed with the image processing units 13A, 13B and 13C for each cutout image, and the gain of the amplifier inside the respective image processing units 13A, 13B and 13C is adjusted to attain a constant per image processing. Thereafter, the respective cutout images are synthesized in the synthesizing unit 14 to create a single image, which is D/A converted at the D/A unit 17, and then displayed on the synthesized image display unit 19.

Third Embodiment

Figure 9:
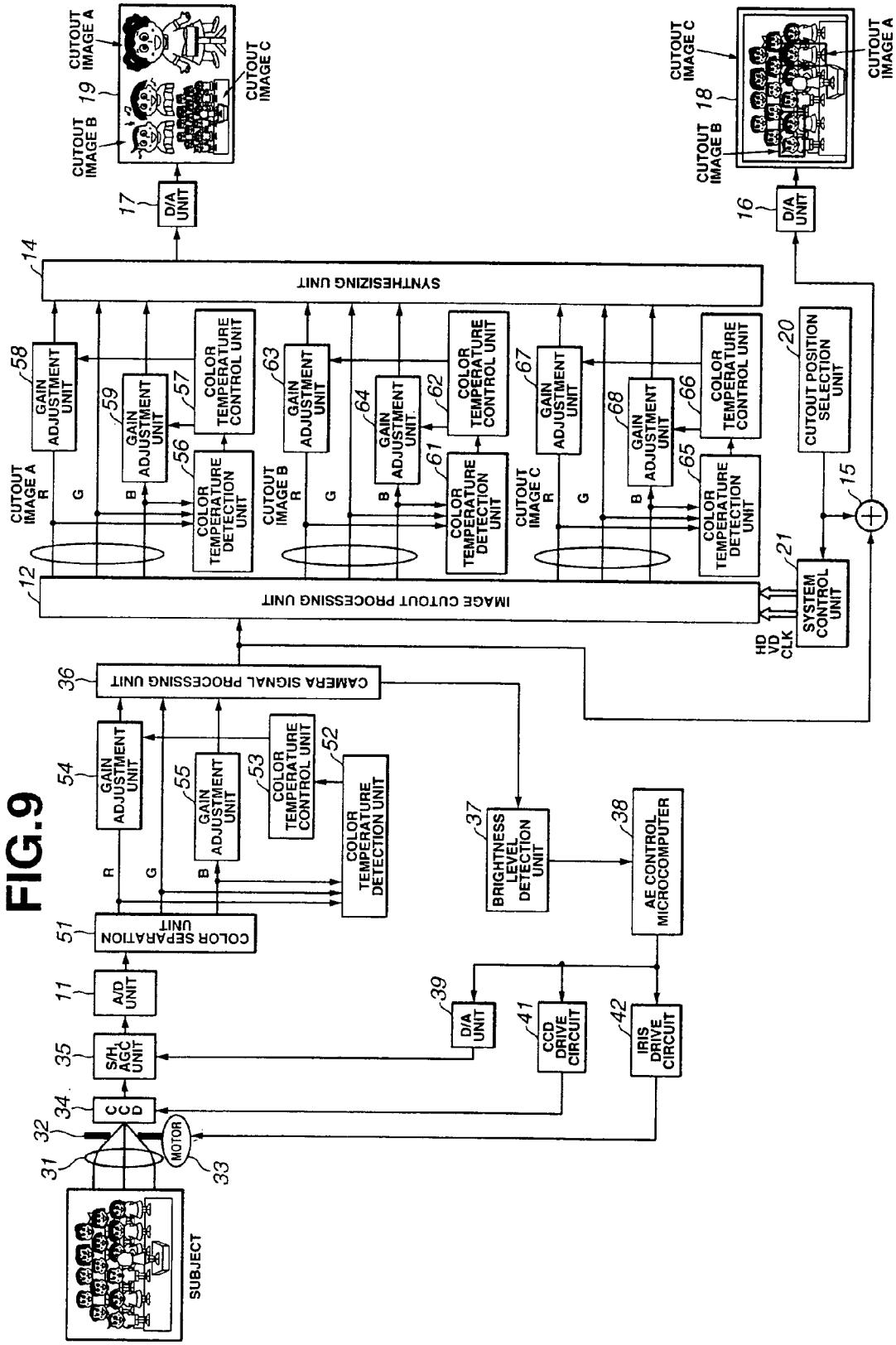
FIG. 9 is a block diagram of the image processing device according to a third embodiment of the present invention.

FIG. 9 is a block diagram of the image processing device according to the third embodiment of the present invention. This embodiment aims to correct the color balance.

This image processing device comprises a camera optical lens 31, an iris (aperture) 32 in which the amount of exposure is controlled with a motor 33, an AE control system (as with FIG. 6, 37, 38, 39, 41 and 42), a CCD 34 which is an image pickup element having a Bayer arrangement filter, a S/H, AGC unit 35, an A/D unit 11, a color separation unit 51 for converting the Bayer arranged image into an RGB signal, a color temperature detection unit 52 for detecting the ratio of the RGB signal, a color temperature control unit 53 for controlling the gain of R and B from the detection results, gain adjustment units 54 and 55 for adjusting the gain of the R and B signals, a camera signal processing unit 36 for performing signal processing of color, brightness, timing and the like, an image cutout processing unit 12, processing circuits (56 to 59, 61 to 64, 65 to 68) for adjusting the respective colors of the respective cutout images A, B and C after the image is cut out in the image cutout processing unit 12, a system control unit 21, a cutout position selection unit 20, an adder 15, D/A units 16 and 17, an overall image display device 18, and a synthesized image display device 19. The foregoing color temperature detection unit 52, color temperature control unit 53 and gain adjustment units 54 and 55 are for performing the color adjustment of the overall image.

The image pickup signal picked up by the CCD 34 is A/D converted and thereafter converted into an RGB signal with the color separation unit 51, and then the foregoing color temperature detection unit 52, color temperature control unit 53 and gain adjustment units 54 and 55 perform color adjustment (AWB, so-called auto white balance) of the overall image. Next, the camera signal processing unit 36 performs camera signal processing of the brightness, timing and the like, and, after the image is cut out with the image cutout processing unit 12, these images are synthesized via the processing circuits (56 to 59, 61 to 64, 65 to 68) for adjusting the respective colors (AWB, in other words auto white balance) of the respective cutout images A, B and C as with the color adjustment of the overall image, and then subjected to D/A conversion and other processing similar to FIG. 1.

The processing circuits (56 to 59, 61 to 64, 65 to 68) have the same constitution for adjusting the respective colors of the overall image, and the processing circuit of cutout image A comprises a color temperature detection unit 56 for detecting the ratio of the RGB signal, a color temperature control unit 57 for controlling the gain of R and B based on the detection results, and gain adjustment units 58 and 59 for adjusting the gain of the R and B signals; the processing circuit of cutout image B comprises a color temperature detection unit 61 for detecting the ratio of the RGB signal, a color temperature control unit 62 for controlling the gain of R and B based on the detection results, and gain adjustment units 63 and 64 for adjusting the gain of the R and B signals; and the processing circuit of cutout image C comprises a color temperature detection unit 65 for detecting the ratio of the RGB signal, a color temperature control unit 66 for controlling the gain of R and B based on the detection results, and gain adjustment units 67 and 68 for adjusting the gain of the R and B signals. Color adjustment is performed with the respective processing circuits for the respective cutout images A, B and C.

In the foregoing constitution, foremost, although the image pickup signal from the CCD 34 is subjected to color correction in relation to the overall image, image cutout processing is performed to the color-corrected image and color correction is further performed to the plurality of images (3 in the drawing). Color correction is performed to the overall image and to the respective cutout images, and, upon detecting the data of R, G and B, color adjustment is performed to B and R such that the balance thereof (white balance for example) is maintained.

The method of color correction may be a conventional method; that is, processing of integrating the overall screen (in the case of a cutout image, the overall screen of such cutout image) such that the RGB will become constant, integrating the portion of low saturation upon excluding the large colored sections within the screen (for instance, in the case of a subject where most of the screen is leaves and there is a ground in the periphery, the leaves are deleted, and color balance is calculated with only the color data of the ground) such that the RGB will become constant, and so on. Incidentally, the second embodiment and third embodiment of FIG. 6 and FIG. 9 may be combined to correct both the brightness and color of the respective cutout images.

Fourth Embodiment

Figure 10:
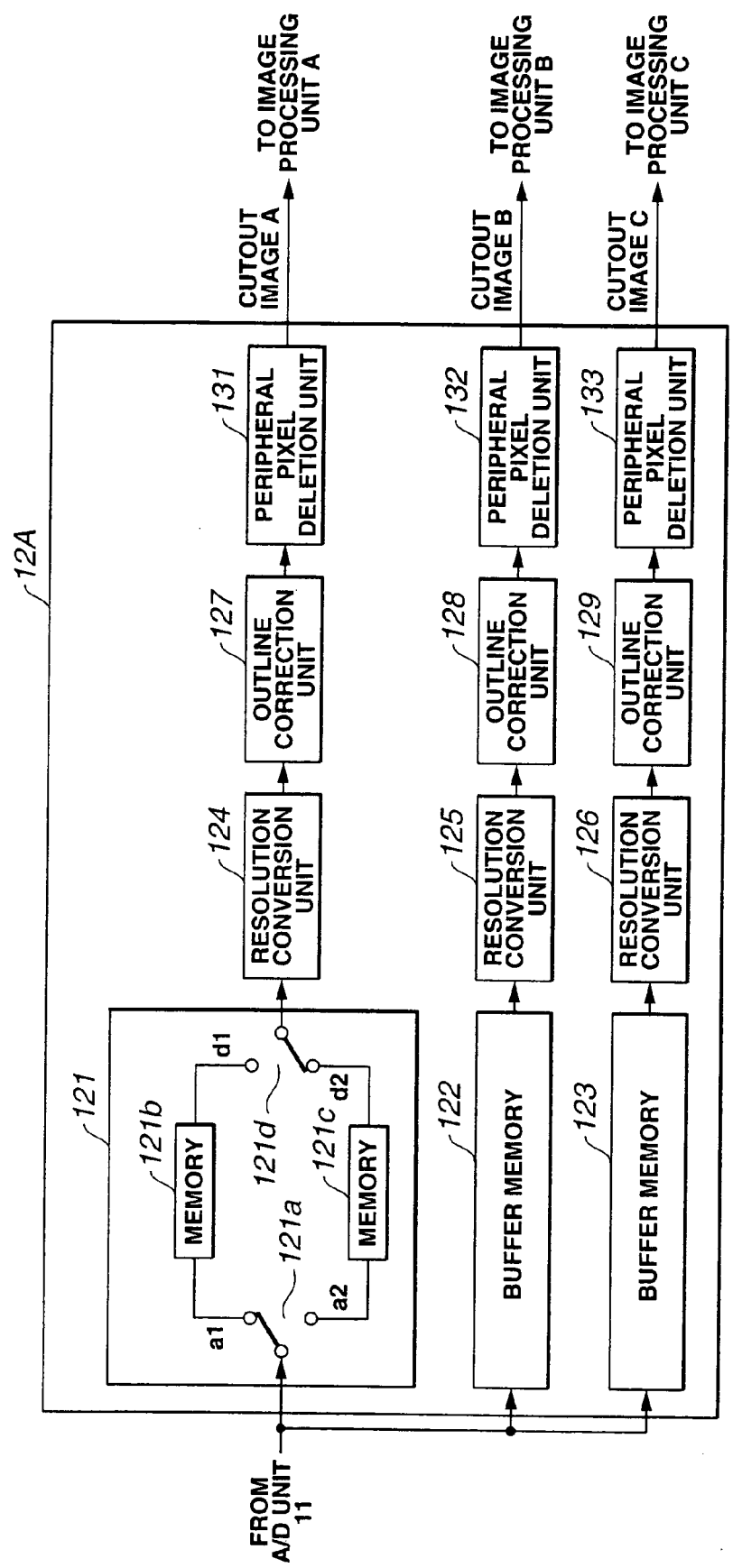
FIG. 10 is a block diagram of the cutout image processing unit according to a fourth embodiment of the present invention.

FIG. 10 is a block diagram of the cutout image processing unit according to the fourth embodiment of the present invention. This embodiment aims to correct the outline. A case where there are three cutout images is explained.

The cutout image processing unit 12A depicted in FIG. 10 comprises a plurality of image cutout frame buffer memories 121, 122 and 123 (3 in the drawing) for storing image data from the A/D unit 11, resolution conversion units 124, 125 and 126 for enlarging or reducing the respective cutout images from the frame buffer memories 121, 122 and 123 and outputting the same, outline correction units 127, 128 and 129 for changing the amount of outline correction of the respective resolution-converted cutout images A, B and C from the resolution conversion units 124, 125 and 126 in proportion to the enlargement rate of the resolution of the displayed image of the synthesized image display device 19 in relation to the resolution of the three cutout images, and peripheral pixel deletion units 131, 132 and 133 for deleting the unnecessary peripheral pixels from the cutout images A, B and C in which the outlines thereof are respectively corrected with the outline correction units 127, 128 and 129.

The operation is now explained.

Since the cutout image will be an indistinct image in accordance to the increase in the enlargement ratio, the amount of intensifying the outline correction is increased in proportion to the enlargement ratio. The gazette of Japanese Patent Laid-Open Publication No. H9-51444 proposes changing the outline correction value with a lookup table based on the concentration information or the like of the film, but the present invention performs processing for changing the outline correction value in accordance with the enlargement ratio, with the enlargement ratio for enlarging the display size on the synthesized image display device 19 of the cutout images cut out based on the cutout position information from the respective frame images of the buffer memories 121, 122 and 123 as the parameter. Incidentally, the outline correction units 127, 128 and 129 will not perform outline correction if the resolution of the display image in relation to the resolution of the cutout image is not to be enlarged or reduced.

Upon performing this outline correction, several extra peripheral pixels are cut out from the images to be cut out from the respective frame images of the buffer memories 121, 122 and 123 so that two dimensional digital filter processing can also be performed to the pixels at the edges of the cutout images. Then, after the outline correction processing, the unnecessary peripheral pixels are deleted.

Fifth Embodiment

Figure 11:
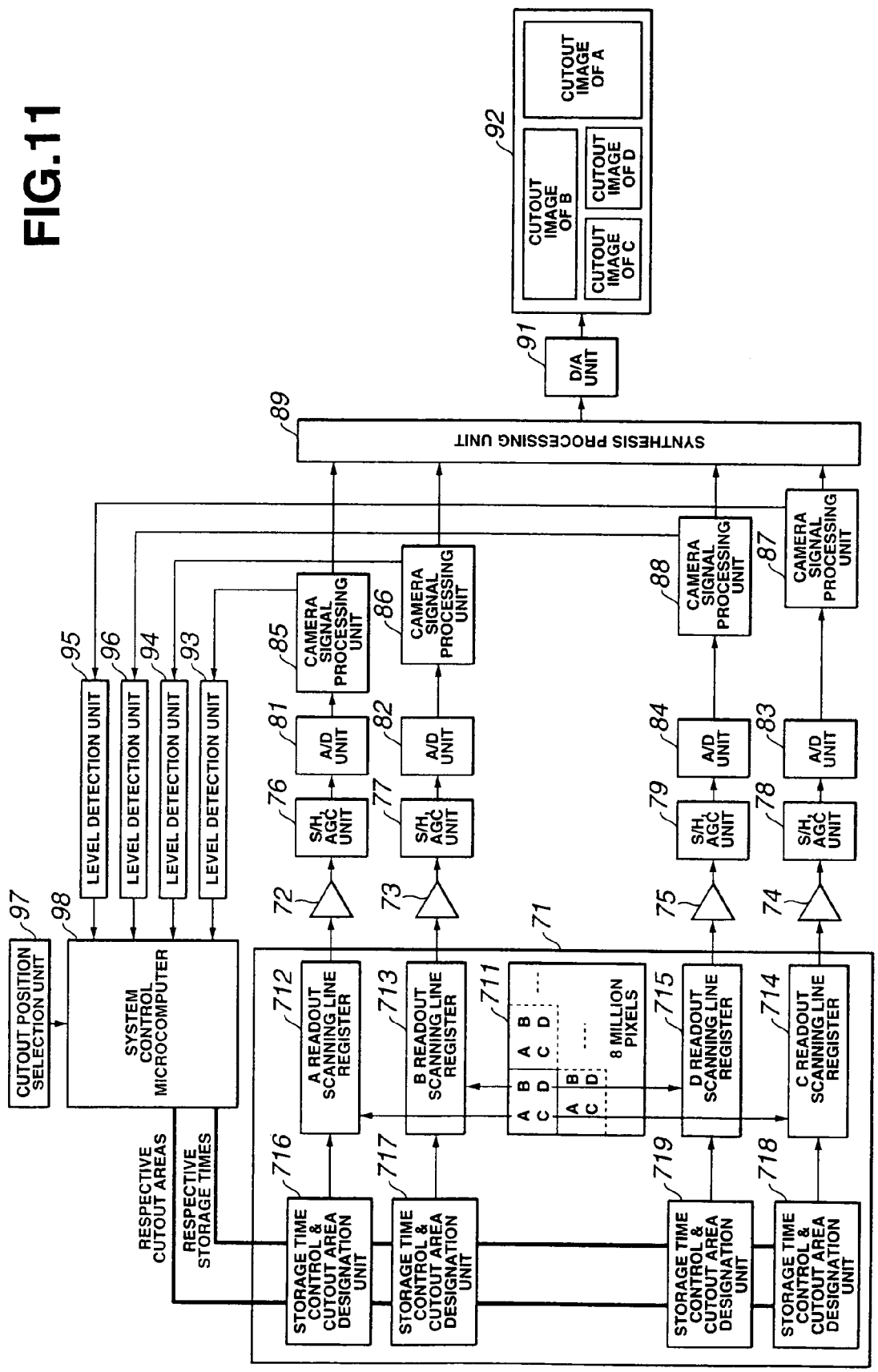
FIG. 11 is a block diagram of the image processing device according to a fifth embodiment of the present invention.

FIG. 11 is a block diagram of the image processing device according to the fifth embodiment of the present invention. This embodiment is a practical example of reading out a plurality of cutout images from the image pickup element, and level adjustment is performed by controlling the storage time within the image pickup element.

The image processing device depicted in FIG. 11 is constituted by comprising an image pickup element 71 capable of outputting a plurality of cutout images (4 in the drawing) from a single image and setting a storage time for each cutout image, a system control microcomputer 98 for setting the respective cutout areas and storage times of the image pickup element 71, a camera signal processing system (72 to 79, 81 to 89, 91) for processing the respective cutout images from the image pickup element 71, a synthesized image display device 92 for synthesizing and displaying the plurality of cutout images, level detection units 93 to 96 for detecting the brightness value per cutout image from the camera signal processing system (72 to 79, 81 to 89, 91), and a cutout position selection unit 97 for performing processing to select the cutout position of the image.

The image pickup element 71, for instance, is an 8 million pixel image pickup element capable of 4-wire output with 4 pixels in a 4-block shape as one unit and obtaining four cutout images. In other words, the image pickup element 71 has 8 million pixels, and comprises an element unit 711 constituted of 2 million blocks with four block shape pixels A, B, C and D as one unit, an A readout scanning line register 712, a B readout scanning line register 713, a C readout scanning line register 714, a D readout scanning line register 715, and storage time control & cutout area designation units 716, 717, 718 and 719. The A readout scanning line register 712 reads out 2 million pixels worth of exposure accumulated data one horizontal line at a time constituted by collecting only pixel A existing every other pixel vertically and horizontally in the element unit 711, and outputs this serially. The B readout scanning line register 713 reads out 2 million pixels worth of exposure accumulated data one horizontal line at a time constituted by collecting only pixel B existing every other pixel vertically and horizontally in the element unit 711, and outputs this serially. The C readout scanning line register 714 reads out 2 million pixels worth of exposure accumulated data one horizontal line at a time constituted by collecting only pixel C existing every other pixel vertically and horizontally in the element unit 711, and outputs this serially. The D readout scanning line register 715 reads out 2 million pixels worth of exposure accumulated data one horizontal line at a time constituted by collecting only pixel D existing every other pixel vertically and horizontally in the element unit 711, and outputs this serially. The storage time control & cutout area designation units 716 is able to control the storage time of the 2 million pixel area constituted by collecting only pixel A existing every other pixel vertically and horizontally in the element unit 711, and further designates a desired cutout area from such 2 million pixel area. The storage time control & cutout area designation units 717 is able to control the storage time of the 2 million pixel area constituted by collecting only pixel B existing every other pixel vertically and horizontally in the element unit 711, and further designates a desired cutout area from such 2 million pixel area. The storage time control & cutout area designation units 718 is able to control the storage time of the 2 million pixel area constituted by collecting only pixel C existing every other pixel vertically and horizontally in the element unit 711, and further designates a desired cutout area from such 2 million pixel area. The storage time control & cutout area designation units 719 is able to control the storage time of the 2 million pixel area constituted by collecting only pixel D existing every other pixel vertically and horizontally in the element unit 711, and further designates a desired cutout area from such 2 million pixel area.

The camera signal processing system (72 to 79, 81 to 89, 91) extracts and adjusts AGC level at the S/H, AGC units 76, 77, 78 and 79, via the buffer amplifiers 72, 73, 74 and 75, as the pixel signal the signal of cutout images A, B, C and D (this is an image pickup signal of the cutout image cut out to an appropriate size with the cutout designation of the four respective 2 million pixel areas of A, B, C and D) read out from the A, B, C and D readout scanning line registers 712, 713, 714 and 715 upon being subjected to storage time control and cutout area designation, and, after converting these signals into digital signals at the A/D units 81, 82, 83 and 84, signal processing such as color adjustment is performed at the camera signal processing units 85, 86, 87 and 88, these are supplied to and synthesized with the synthesizing unit 89 as a cutout image signal of an appropriate size of the four images A, B, C and D, further converted into an analog signal at the D/A unit 91, and the synthesized image is thereby displayed on the synthesized image display unit 92.

The level detection units 93, 94, 95 and 96 respectively detect the brightness level of the respective cutout images of the four images A, B, C and D from the camera signal processing units 85, 86, 87 and 88, and supplies the brightness level to the system control microcomputer 98.

The system control microcomputer 98 designates the respective cutout areas pursuant to the processing of the cutout position selection unit 97 based on the user's operation, determines the charge storage time (also referred to as an electronic shutter) of the respective cutout images based on the brightness data from the level detection units 93, 94, 95 and 96, and performs control (makes an adjustment) such that the brightness of the cutout image becomes a predetermined brightness.

According to the present embodiment, when using an image pickup element capable of outputting a plurality of arbitrary areas, as a result of detecting the brightness level for each cutout processing area and controlling (determining) the storage time (or shutter speed), the brightness of the respective cutout images on the synthesized screen can be made appropriate. For example, an 8 million pixel image pickup element may be divided into four areas each of 2 million pixels to control the storage time (or shutter speed), and, when it is constituted to abstract cutout images respectively from the four areas, as a result of detecting the brightness level per cutout processing area and appropriately designating the storage time (or shutter speed), the brightness of the respective cutout images on the synthesized screen can be made appropriate. If it is too bright, the storage time (or shutter speed) of the image pickup element 71 is shortened, and if it is too dark, the storage time (or shutter speed) is prolonged to determine the appropriate brightness of the respective cutout images.

Sixth Embodiment

Figure 12:
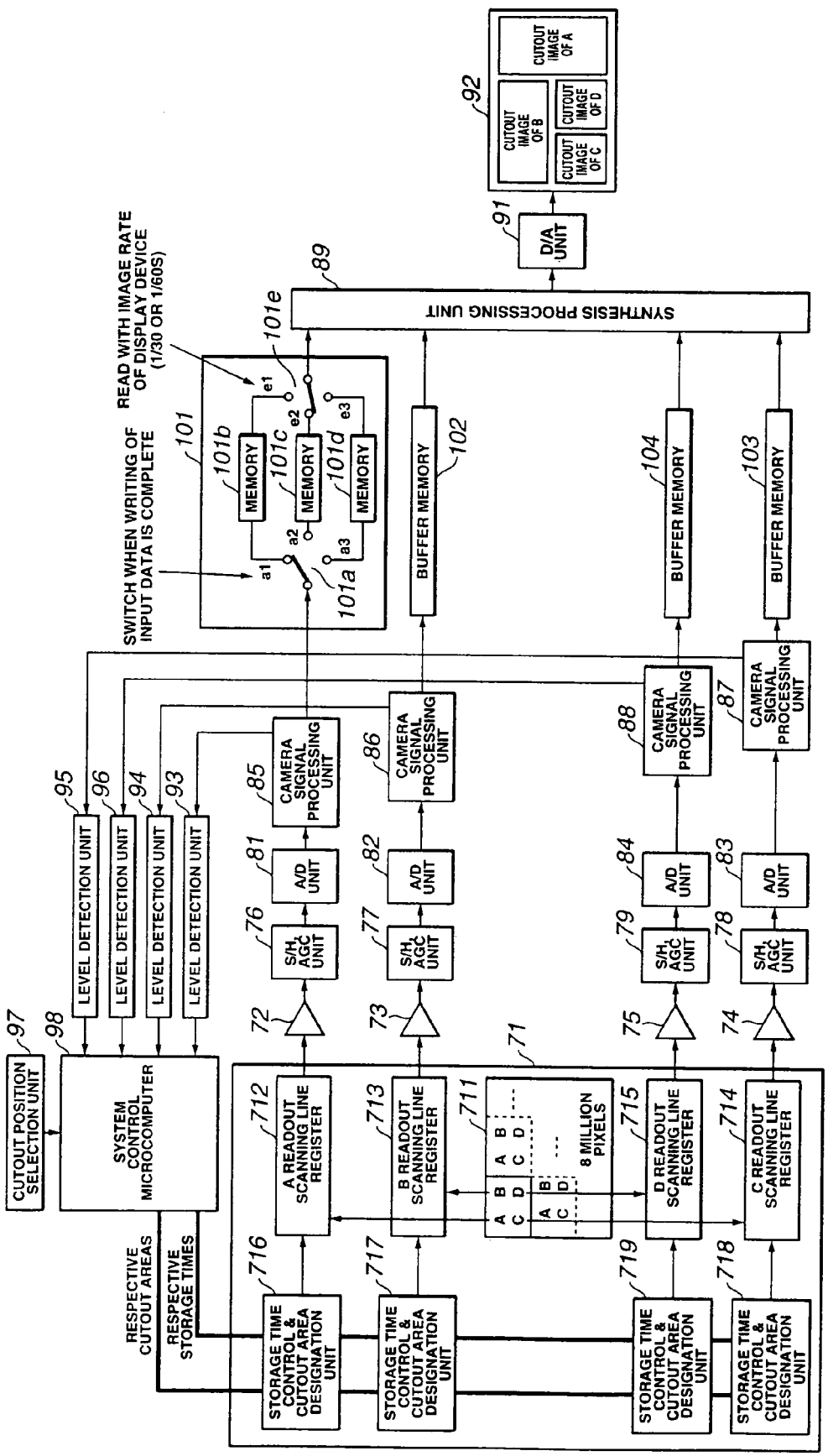
FIG. 12 is a block diagram of the image processing device according to a sixth embodiment of the present invention.

FIG. 12 is a block diagram of the image processing device according to the sixth embodiment. This embodiment aims to improve the speed of the image pickup element having a slow frame rate.

FIG. 12 is effective upon using an image pickup element (speed of 10 frames per second, for example) having a slow frame rate regarding the image processing device for performing level adjustment within the image pickup element illustrated in FIG. 11.

In order to output a motion image, it is generally necessary to process a single image at a speed of 30 frames or more per second. Nevertheless, when the number of pixels of the image pickup element 71 increases, the processing every other pixel will become faster as a matter of course in order to process a single image at the same speed (speed of 30 frames or more per second), and the constitution of the image pickup element 72 and camera signal processing system (72 to 79, 81 to 89, 91) will become complex and the cost will increase.

With respect to this point, although an image pickup element for a digital camera is not able to perform high speed processing at a motion image level, there are those with high resolution. For example, in the case of an image pickup element capable of processing at a speed of 10 frames per second of all pixels, if the cutout image is ⅓ or less of the overall pixels, the transmission speed can be increased threefold since the transmission time will only be ⅓. Thus, since 30 cutout images can be sent per second, motion image processing is enabled.

The sixth embodiment is of a constitution where a plurality of buffer memories 101, 102, 103 and 104 (4 in the drawing to correspond to the four cutout images) per cutout image to realize a temporal buffer function (temporal adjustment function) between the camera1 signal processing units 85, 86, 87 and 88 and the synthesizing processing unit 89 in the constitution of the fifth embodiment depicted in FIG. 11. And, a memory buffer function based on three frame memories 101b, 101c and 110d in relation to the input/output of a single cutout image in a single buffer memory is provided, and switches 101a and 101e are respectively arranged at the input side and output side thereof. The input side switch 101a enables the switching of the switching terminals a1, a2 and a3 such that the subsequent frame memory can be switched after the writing of the input data into a single frame memory among the three frame memories 101b, 101c and 101d, the output side 101e enables the switching of the switching terminals e1, e2 and e3 such that switching to the written subsequent frame memory is enabled after the readout from the previous frame memory in relation to the written frame memory among the three frame memories 101b, 101c and 101d, and readout at the image display rate (30 frames per second; that is, ⅟30 sec) of the synthesized image display device 92 is performed. Incidentally, the image display rate may be 60 frames per second (i.e. ⅟60 sec). The remaining constitution is the same as FIG. 11.

The operation depicted in FIG. 12 is now explained.

It is assumed that the frame rate of the cutout image size read out (cut out) from the image pickup element 71 is, for instance, 15 frames per second for A, 20 frames per second for B, 30 frames per second for C, and 30 frames per second for D. In order to realize this kind of frame rate, as shown in the screen of the display device 92, the cutout image of A is the largest and occupies roughly half of the screen, the cutout image of B is roughly half the size of the cutout image of A, and the cutout images of C and D are roughly the half the size of the cutout image of B. Thus, the cutout images of C and D in which the cutout area is designated narrowest can be read out at 30 frames per second (i.e. motion image) from the image pickup element 71.

After having performed the same camera image processing as depicted in FIG. 11, to explain the memory input (writing) side of the buffer memory 101, for instance, among the four buffer memories 101 to 104 corresponding to the four cutout images, the input switch is switched for each writing of a single cutout image in the order of frame memory 101b to frame memory 101c to frame memory 101d to frame memory 101b, and so on.

The memory output (readout) side sequentially reads out from the memory in which the latest writing has been completed. For example, in a state of currently reading out the frame memory 101b, until the writing of the subsequent frame memory (frame memory 101c for instance) is completed, readout is continued from the frame memory 101b at the same timing (⅟30 sec for example), and, when the frame memory 101c finishes writing, the output switch is switched at the timing after the readout of all data of the frame memory 101b is completed, and the readout of the frame memory 101c is commenced.

The operation of the other buffer memories 102, 103 and 104 is the same, and, since the respective cutout images of A, B, C and D are respectively input to the buffer memories 101, 102, 103 and 104 at 15 frames/second, 20 frames/second, 30 frames/second and 30 frames/second, the input side switch (indicating 101a) of the three frame memories constituting the buffer memory 101 are switched at a speed of roughly 15 frames per second, image data is written in the three frame memories (indicating 101b, 101c and 101d) sequentially per frame in cycles, and the readout is read out from the three frame memories to the display device 92 at a required readout rate (30 frames per second).

Further, the input side switch (not shown) of the three frame memories constituting the buffer memory 102 are switched at a speed of roughly 20 frames per second, image data is written in the three frame memories (not shown) sequentially per frame in cycles, and the readout is read out from the three frame memories to the display device 92 at a required readout rate (30 frames per second).

Similarly, the input side switch (not shown) of the three frame memories constituting the buffer memories 103 and 104 are switched at a speed of roughly 30 frames per second, image data is written in the three frame memories (not shown) sequentially per frame in cycles, and the readout is read out from the three frame memories to the display device 92 at a required readout rate (30 frames per second).

As described above, although motion images are not possible when an image pickup element having a slow frame rate (10 frames per second for example) tries to read out the entire image, if the size of the cutout image in which the cutout area has been designated is made small, faster readout is enabled since only a narrow area needs to be read out from the image pickup element, and this can be output as a motion image (30 frames per second). In other words, a cutout image with a relatively narrow area can be displayed at a motion image rate (⅟30 sec for example).

Seventh Embodiment

Figure 13:
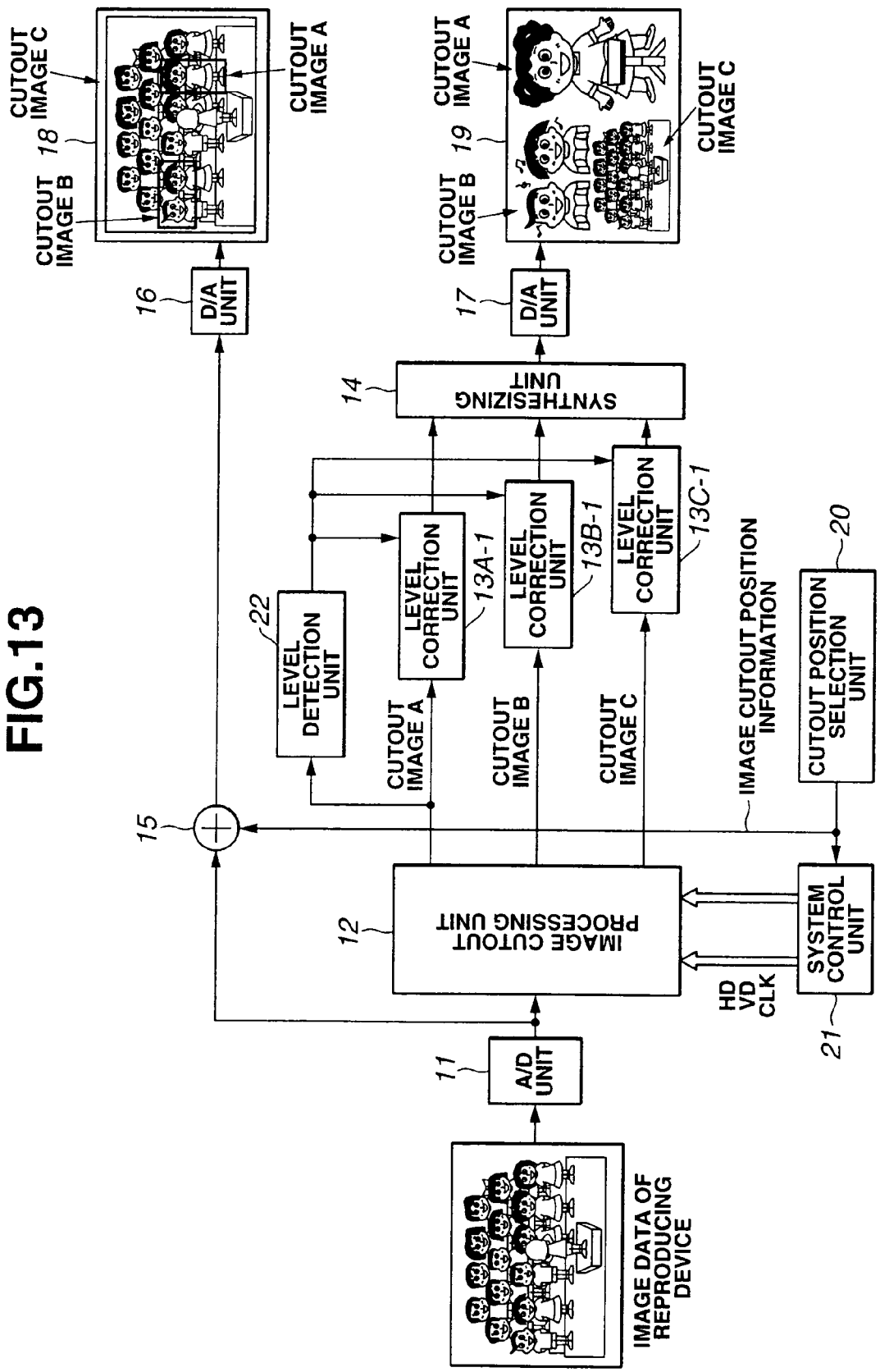
FIG. 13 is a block diagram of the image processing device according to a seventh embodiment of the present invention.

FIG. 13 is a block diagram of the image processing device according to the seventh embodiment of the present invention. This embodiment predetermines an image among the plurality of cutout images cut out from the same image data as a reference image (cutout image A for example), detects the level of cutout image A, and adjusts the level of the other cutout images B, C . . . in addition to the reference image A based on this detection level.

The image processing device depicted in FIG. 13 comprises an A/D unit 11 for digitizing the image input from the reproducing device (the A/D unit is not required in a case where the reproducing device is digital image data from the memory or the like), an image cutout processing unit 12 as the division area setting means for creating a plurality of cutout images (3 in the drawing; A, B and C) designated by the user, a level detection unit 22 as the reference area setting means (reference area setting unit) for setting a single reference area among the plurality of cutout images and a parameter setting means (parameter setting unit) for detecting the signal level of the reference area, level correction units 13A-1, 13B-1 and 13C-1 for performing the level correction of the respective cutout images A, B and C based on the reference area detection level of the level detection unit 22, a synthesizing unit 14 for synthesizing the plurality of cutout images A, B and C into a single image, an adder 15 for adding the overall image and the cutout area display (mark) selected with the user's operation, a D/A unit 16 for converting the overall image data into analog data, an overall image display device 18 for displaying the overall image, a synthesized image display device 19 for displaying the synthesized image in which a plurality of cutout images are synthesized, a cutout position selection unit 20 for designating the position of the cutout image on the screen of the overall image display device 18, and a system control unit 21 for controlling the image cutout processing unit 12 and creating cutout images using the image cutout position information from the cutout position selection unit 20, the horizontal synchronization signal (HD), vertical synchronization signal (VD) and clock signal. Level correction refers to the adjustment of the adjustment parameter level regarding the brightness and color.

Moreover, the reference area here is cutout image A. With respect to the designation of the reference area, the first image cut out may be designated as the reference area, the image having the smallest cutout area may be designated as the reference area, or may be designated by clicking one among the plurality of cutout areas, or may be automatically switched in a certain timing. The designated reference area is displayed on the overall image display device 18 by making the outer frame of the box a relatively thick line or adding color to indicate the difference from the other cutout areas.

The difference between the foregoing constitution and the constitution depicted in FIG. 1 is that reference area setting means for setting a single reference area among the plurality of cutout images and a level detection unit 22 for detecting the signal level of this reference area are additionally provided so as to perform the level correction of the respective cutout images A, B and C based on the reference area detection level of the level detection unit 22; that is, upon employing the same correction amount (control amount). Therefore, if the level correction amount in relation to the reference area is double for example, the individual level correction amounts of the other cutout areas will also be double. Contrarily, with the constitution depicted in FIG. 1, level correction may be performed upon setting a different correction amount (control amount) to the plurality of cutout images A, B and C, respectively.

The operation depicted in FIG. 13 is now explained.

The operation up to the image cutout processing unit 12 is the same as in FIG. 1. Subsequently, the level detection unit 22 performs the level detection of the image data of the reference area, and performs the level correction of the other cutout images such that the signal level of the reference area will be appropriate. Since correction matching the signal level of the image of the reference area will be performed to the images of the other cutout areas, an image that will not give any sense of discomfort to the observer can be provided as the overall synthesized image.

Incidentally, although not shown, level detection may be performed for each cutout area, and the level correction amount of the cutout images other than the reference area may be determined by performing an arithmetic mean to the level detected at the reference area and the level detected at the respective cutout images, or performing weighting with the cutout size.

Eighth Embodiment

Figure 14:
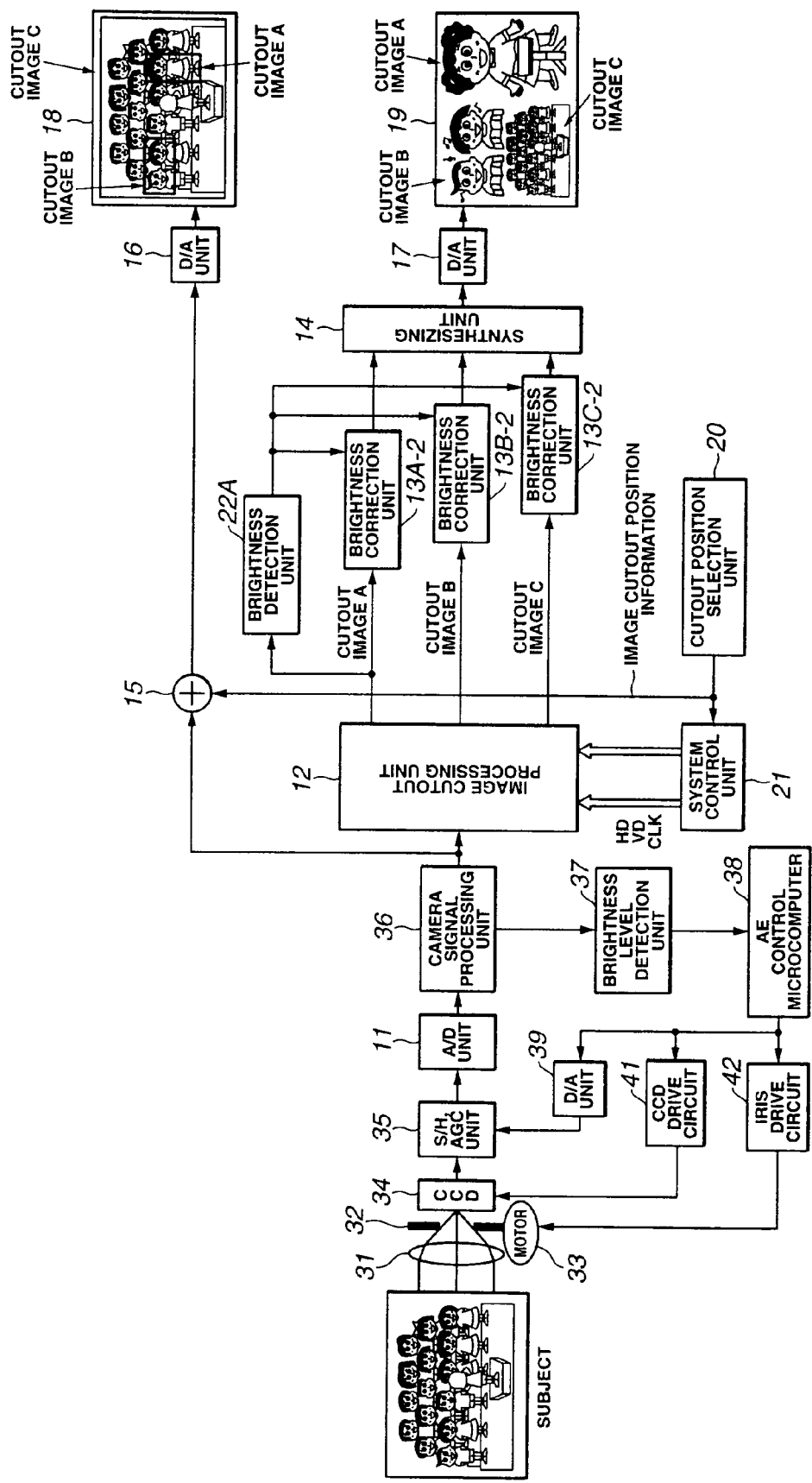
FIG. 14 is a block diagram of the image processing device according to an eighth embodiment of the present invention.

FIG. 14 is a block diagram of the image processing device according to the eighth embodiment of the present invention. This embodiment aims to correct the level of the brightness (exposure) by replacing the level detection unit 22 of the seventh embodiment depicted in FIG. 13 with a brightness detection unit 22A, and replacing the level correction units 13A-1, 13B-1 and 13C-1 of the seventh embodiment illustrated in FIG. 13 with brightness correction units 13A-2, 13B-2 and 13C-2.

Further, the present embodiment is of a configuration adopting the AE control system (37, 38, 39, 41, 42) in relation to the overall screen depicted in FIG. 4. The AE control system comprises, as explained in the second embodiment, a brightness level detection unit 37 for detecting the brightness level, an AE control microcomputer 38 having an AE processing method program pursuant to the brightness level built therein, a D/A unit 39 for analog-converting the digital brightness signal form the AE control microcomputer 38 into an AGC control signal, a CCD drive circuit 41 for controlling the CCD operation such as the electronic shutter speed based on the instructions from the AE control microcomputer 38, and an iris drive circuit 42 for driving the iris control motor 33 based on the instructions from the AE control microcomputer 38.

To explain the operation of the eighth embodiment, the AE control system (37, 38, 39, 41, 42) AE-controls the overall photographed image, thereafter detects the brightness value of the cutout image of the reference area (cutout image A for example) with the brightness detection unit 22A, performs brightness correction of cutout image A with the brightness correction unit 13A-2 according to the correction amount (control amount) based on the reference area brightness value, and simultaneously performs the brightness correction of the other cutout images B and C with the brightness detection units 13B-2 and 13C-2 according to the correction amount (control amount) based on the same reference area brightness value. In other words, the gain of cutout image A is adjusted such that the brightness value of the cutout image (cutout image A for example) will become constant, and this adjustment value will also be applied to the other cutout images B and C.

Incidentally, with respect to the brightness detection with the brightness detection unit 22A, the brightness level may be determined from the average brightness, center weighted photometry or spot photometry data of the reference area image.

According to the eighth embodiment, since means for selecting an image to be the reference among the plurality of cutout images, determining a level of brightness (exposure) from such reference area image, and applying the correction amount (control amount) based on such brightness value data to all cutout images are provided, it is possible to match the brightness to the cutout image to be focused most.

Ninth Embodiment

Figure 15:
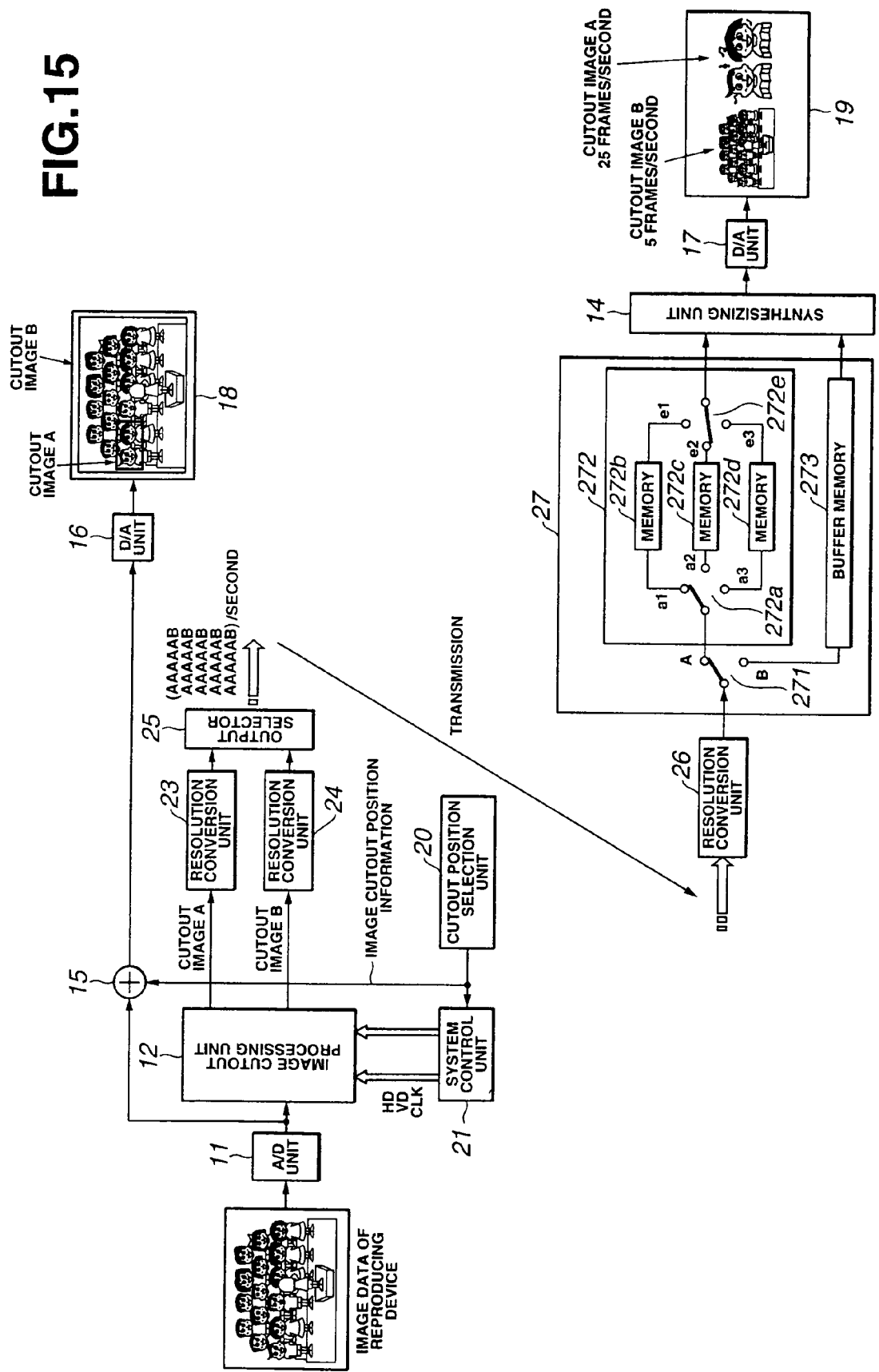
FIG. 15 is a block diagram of the image processing device according to a ninth embodiment of the present invention.
Figure 16:
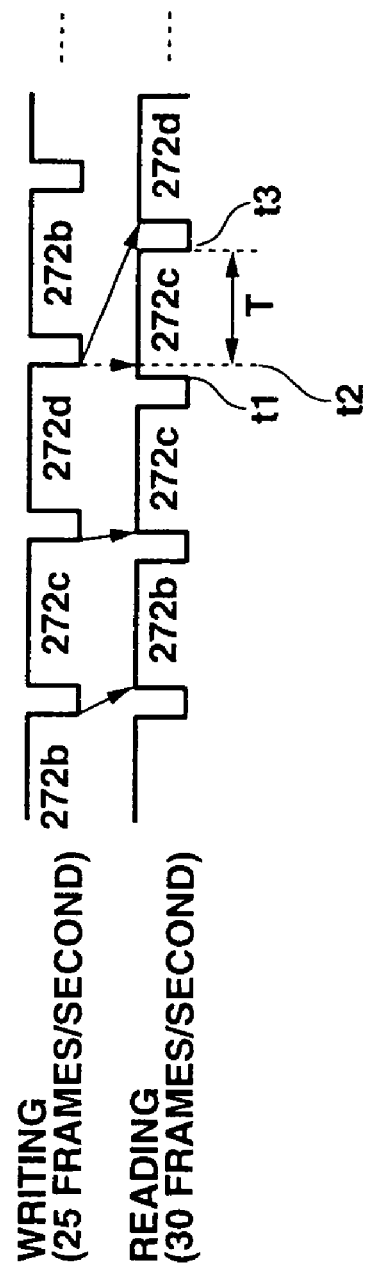
FIG. 16A and FIG. 16B are explanatory diagrams for explaining the scan converter operation of the buffer memory means illustrated in FIG. 15.

FIG. 15 is a block diagram of the image processing device according to the ninth embodiment of the present invention. This embodiment aims to display the reference area to be focused on at a motion image level in comparison to the other areas in a state where the communication speed (data rate) is rate controlled. Here, a plurality of cutout images are made to be two cutout images A and B, and cutout image A will be the reference image. It is assumed that this is a situation where two cutout images A and B are obtained, transmitted and cutout image A is to be viewed at a motion image level or a level close to a motion image (quasi motion image), and cutout image B is to be viewed in frames. Further, it is assumed that the transmission system is able to transmit 30 frames per second if a VGA (640×480 dots, short for Video Graphic Array), whereby 25 frames of cutout image A are to be transmitted and 5 frames of cutout image B are to be transmitted.

The image processing device depicted in FIG. 15 comprises an A/D unit 11 for digitizing the image input from the reproducing device (the A/D unit is not required in a case where the reproducing device is compatible with digital image data output), an image cutout processing unit 12 for inputting digital image signals and creating a plurality of cutout images (2 in the drawing) designated by the user from the digital image, an adder 15 for adding the overall image and the cutout area display (mark) selected with the user's operation, a D/A unit 16 for converting the overall image data into analog data, an overall image display device 18 for displaying the overall image, a cutout position selection unit 20 for designating the position of the cutout image on the screen of the overall image display device 18, a system control unit 21 for controlling the image cutout processing unit 12 and creating cutout images using the image cutout position information from the cutout position selection unit 20, the horizontal synchronization signal (HD), vertical synchronization signal (VD) and clock signal, first resolution conversion units 23 and 24, an output selector 25, a second resolution conversion unit 26, buffer memory means 27, a synthesizing unit 14 for synthesizing the plurality of cutout images A and B into a single image, a D/A unit 17 for converting the synthesized image into an analog signal, and a synthesized image display device 19 for displaying the synthesized image. The first resolution conversion units 23 and 24 converts the resolution of the cutout images A and B to their respective transmission sizes (to make them into a VGA size; that is, enlarging cutout image A into a VGA size, reducing cutout image B into a VGA size). The output selector 25 is for selecting the reference cutout image A and the other cutout image B which have been converted into the same transmission size (VGA size for example) with the first resolution conversion units 23 and 24, and selects the reference cutout image A more often than the other cutout image B (for example, at a rate of image A being selected 5 times and image B being selected 1 time; in other words, 25 frames of image A are selected and transmitted per second whereas 5 frames of image B are selected and transmitted per second). The second resolution conversion unit 26 converts the resolution of images A and B in VGA size selected with the output selector 25 and transmitted in serial frames into a resolution (SXGA for example) to be actually displayed on the synthesized image display device 19. The buffer memory means 27 converts the cutout images A and B in which the resolution thereof has been converted with the second resolution conversion unit 26 into the frame rate of the synthesized image display device 19.

The output selector 25 reads the cutout images A and B in which the resolution thereof has been converted into a VGA size, for instance, from the memory inside the respective resolution conversion units 23 and 24, and outputs this serially such as AAAAABAAAAABAAAAABAAAAA-BAAAAAB per second.

The buffer memory means 27 is provided with a plurality of buffer memories 272 and 273 (2 in the drawing corresponding to two cutout images) for each cutout image to realize the temporal buffer function (temporal adjustment function), and an input switching switch 271 provided to the input side of the two buffer memories 272 and 273 and for selectively switching the images A and B in which the resolution thereof has been converted with the resolution conversion unit 26, and inputting this to the buffer memories 272 and 273.

Although the input switching switch 271 selectively switches and outputs to the output terminals A and B the serial data of the foregoing AAAAABAAAAABAAAAA-BAAAAABAAAAAB per second in which the resolution thereof has been converted with the second resolution conversion unit 26, it repeats the switching operation of switch connecting to the output terminal A when image A arrives from the input terminal, and, after image A is continuously input into the buffer memory 272 five times, switch connecting to the output terminal B when image B arrives thereafter, and, after image B is input into the buffer memory 273 once, switch connecting to the output terminal A when image A arrives again.

And, a memory buffer function based on three frame memories 272b, 272c and 272d in relation to the input/output of a single cutout image A in a single buffer memory (the buffer memory 272, for example) is provided, and switches 272a and 272e are respectively arranged at the input side and output side thereof. The input side switch 272a enables the switching of the switching terminals a1, a2 and a3 such that the subsequent frame memory can be switched after the writing of the input data into a single frame memory among the three frame memories 272b, 272c and 272d, the output side 272e enables the switching of the switching terminals e1, e2 and e3 such that switching to the written subsequent frame memory is enabled after the readout from the previous frame memory in relation to the written frame memory among the three frame memories 272b, 272c and 272d, and readout at the image display rate (30 frames per second; that is, 1/30 sec) of the synthesized image display device 19 is conducted. Incidentally, the image display rate may be 60 frames per second (i.e. 1/60 sec). The buffer memory 273 also operates similarly, and readout at the image display rate (30 frames per second; that is, 1/30 sec) of the display device 19 is conducted.

And, after being synthesized with the synthesizing unit 14, the images are analog converted with the D/A unit 17, and then displayed, for example, as two images in rows on the screen of the synthesized image display device 19. Cutout image A is displayed in quasi motion image at 25 frames per second, and cutout image B is displayed in dropped frames at 5 frames per second.

FIG. 16A and FIG. 16B are diagrams for explaining the scan converter operation of the buffer memory means depicted in FIG. 15. To explain the buffer memory 272, FIG. 16A shows the writing state (25 frames per second) to the frame memories 272b, 272c and 272d, and FIG. 16B shows the readout state (30 frames per second) from the frame memories 272b, 272c and 272d. The input side switch 272a switches 25 times per second and 25 frames per second are written sequentially into the frame memories 272b, 272c and 272*d*, and, although the output side switch 272*e* outputs 30 frames per second, when the writing to the frame memories 272*b*, 272*c* and 272*d* is completed and the readout for one frame worth from the previous frame memory is completed, it switches to the subsequent frame memory in which the writing is complete. Thus, even when the readout time t1 (c.f. FIG. 16B) to the frame memory 272 arrives, readout from the previous frame memory 272*c* is conducted once again at a point in time when the writing (c.f. FIG. 16A) to the frame memory 272*d* at time t1 is not yet complete. And, even if the writing to the frame 272*d* is completed at the timing t2 shown with the dotted line, during term T in which the second frame memory readout from the frame memory 272*c* has not yet been completed, the readout is continued, and the written data of the frame memory 272*d* is read after the completion of the second frame readout (time t3).

Next, the resolution conversion of the first resolution conversion units 23 and 24 are separated into a case of pixel skipping and JPEG compression, and the respective operations are explained below.

Resolution Conversion Method 1 (pixel skipping)

The respective cutout images A and B are subjected to resolution conversion at the first resolution conversion units 23 and 24 to become a size transmittable at 30 frames per second (or 60 frames per second).

For example, when the transmission speed is 222 Mbit/sec, the respective cutout images are reduced or enlarged to a size of roughly VGA (640×480 dots) to enable the transmission of 30 frames per second.

(640 pix×480 pix×30 fps×3(RGB)×8 bit=221.2 Mbps)

As a result of the outputs selector 25 selecting and transmitting the reference cutout image A more often than the other cutout image B, even if the communication data rate is relatively slow, the overall synthesized image will not drop frames, and it will thereby be possible to display the reference image A in quasi motion image and the other image B as an image with dropped frames.

The received image is converted into a size to be displayed on the display device 19 based on the resolution conversion of the second resolution conversion unit 26.

Next, the output timing is corrected to match the synthesized image display device 19 with the buffer memory means 27 having the constitution of three frames memory similar to the constitution illustrated in FIG. 12. In other words, cutout image A is written into the three frame memories (272*b*, 272*c* and 272*d*) at 25 frames per second, and cutout image B is written into the three frame memories (not shown) at 5 frames per second, but they are both read out at 30 frames per second, and, after the images are synthesized, the synthesized image is output to the synthesized image display device 19.

(2) Resolution Conversion Method 2 (JPEG Compression)

A single size of the respective cutout images A and B is compressed with JPEG or the like such that it becomes smaller than the predetermined data amount at the first resolution conversion units 23 and 24, and decompressed after being transmitted.

For example, when the transmission speed is 222 Mbit/sec, processing to compress a single image to 925 kb or less is conducted in order to realize the transmission of 30 frames per second.

(925 k×30 fps×8 bit=222 Mbps)

Processing of the image after it is received by the output selector 25 is the same as the "Resolution conversion method 1" described above.

Incidentally, the image to be transmitted does not have to be a cutout image, and may be an overall image, or an image in which a cutout image is synthesized with the overall image having been subjected to resolution conversion may be transmitted in chronological order together with the cutout image in an appropriate ratio.

Tenth Embodiment

Figure 17:
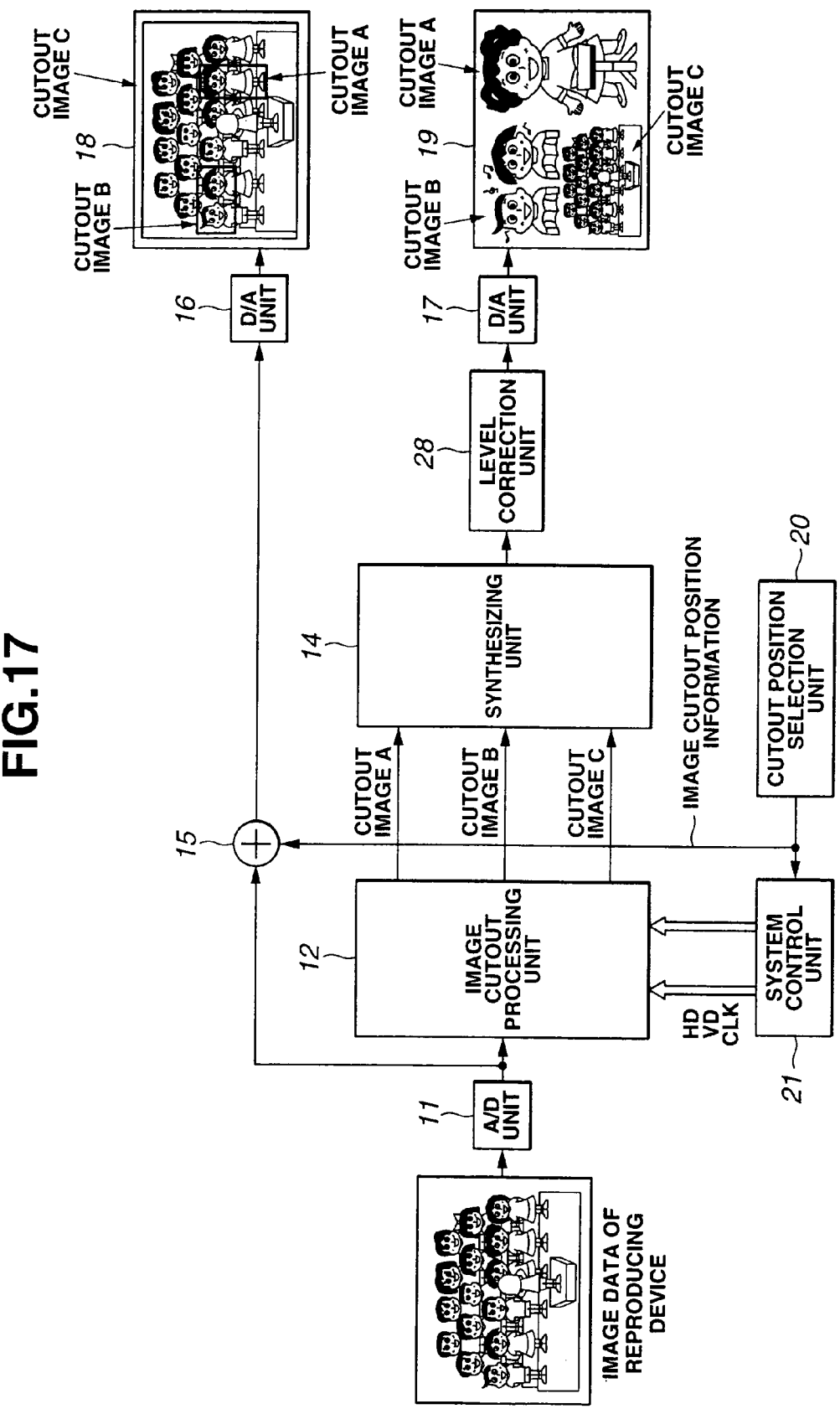
FIG. 17 is a block diagram of the image processing device according to a tenth embodiment of the present invention.

FIG. 17 is a block diagram of the image processing device according to the tenth embodiment of the present invention. This embodiment performs correction such that the average value of the overall image becomes optimum after a plurality of cutout images (3 in the drawing) are synthesized into a single image. The operation of the respective blocks is the same as the first embodiment.

In the first embodiment, the three images A, B and C are synthesized with the synthesizing unit 14 after the three cutout images A, B and C cut out with the image cutout processing unit 12 are subjected to image processing; that is, level correction with the image processing units 13A, 13B and 13C. Contrarily, the tenth embodiment differs from the first embodiment in that the synthesized image is subjected to level correction with the level correction unit 28 after the three cutout images A, B and C cut out with the image cutout processing unit 12 are synthesized with the synthesizing unit 14. Level correction refers to the adjustment of the adjustment parameter level regarding the brightness and color. The level correction unit 28 may be a manual adjustment, or an automatic adjustment where level detection is conducted after the synthesis of the cutout images and making the level correction amount of the level correction unit a predetermined value based on such detection results.

In the constitution of the tenth embodiment, since the level adjustment is not conducted individually as with the first embodiment, if the level difference among the cutout images is relatively small, there is a merit of realizing the same advantages as with the first embodiment at low costs. Further, since this will enable correction close to the adequate value of the screen that is cut out relatively large, the image to be focused on having a large output area will be of an approximately adequate level.

Incidentally, weighting may be performed to each display area and weight may be applied to the smaller display area to realize level correction that does not depend on the size of the display area.

Eleventh Embodiment

Figure 18:
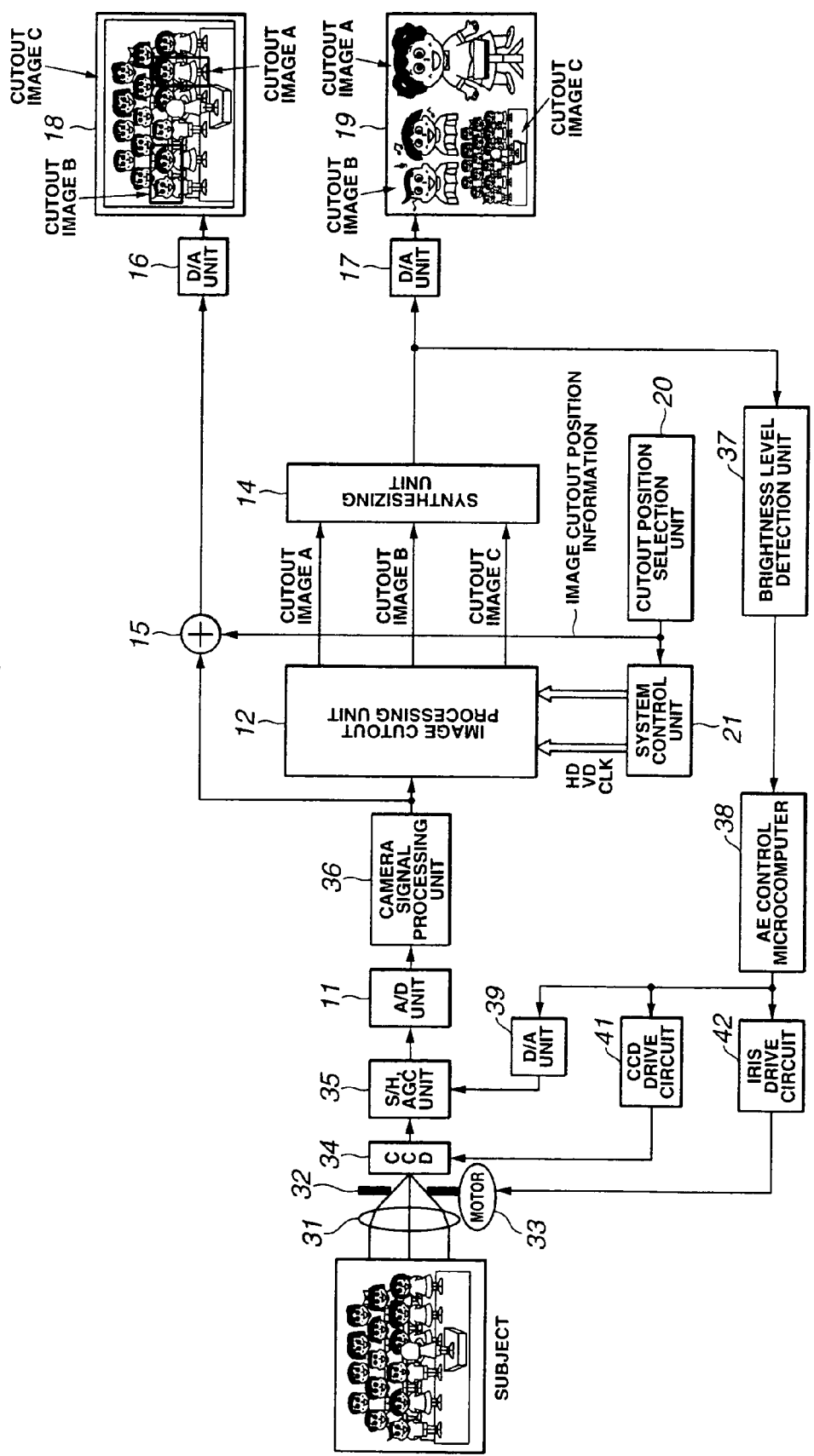
FIG. 18 is a block diagram of the image processing device according to an eleventh embodiment of the present invention.

FIG. 18 is a block diagram of the image processing device according to the eleventh embodiment of the present invention. This embodiment performs AE (automatic exposure) control such that the average value of the overall image becomes appropriate after the plurality of cutout images (3 in the drawing) are synthesized into a single image. The operation of the respective blocks is the same as the second embodiment.

The second embodiment illustrated in FIG. 6 detects the brightness level of the average value of the overall photographed image with the brightness level detection unit 37 and performed AE control with the AE control system (37, 38, 39, 41 and 42) on the one hand, while performing image processing; that is, level correction with the image processing units 13A, 13B and 13C for each of the three cutout images A, B and C with the image cutout processing unit 12, and thereafter synthesizing the three images A, B and C with the synthesizing unit 14. Contrarily, the eleventh embodiment differs from the second embodiment in that, after the three cutout images A, B and C cut out with the image cutout processing unit 12 are synthesized with the synthesizing unit 14, the average value of the synthesized image is detected as the brightness level, the AE control system (37, 38, 39, 41 and 42) is employed to perform AE control.

With the constitution of the eleventh embodiment, as a result of performing AE control with the average value after the synthesis of the plurality of cutout images as the brightness level, brightness control of the respective cutout images may be omitted, thereby realizing a low cost constitution.

Twelfth Embodiment

FIG. 19 is a block diagram of the image processing device according to the twelfth embodiment of the present invention. This embodiment performs color adjustment such that the color balance of the overall image becomes appropriate after a plurality of cutout images (3 in the drawing) is synthesized into a single image. The operation of the respective blocks is the same as the third embodiment.

The third embodiment illustrated in FIG. 9 performs color adjustment with the circuit units (56 to 59, 61 to 64, 65 to 68) for each cutout image cut out with the image cutout processing unit 12 after having performed the color adjustment of the overall image with the circuit units (51 to 55). Contrarily, the twelfth embodiment differs from the third embodiment in that the ratio of the RGB signal of the synthesized image is detected and color adjustment (AWB, in other words auto white balance) is conducted with the circuit units (51 to 55) after the three cutout images A, B and C cut out with the image cutout processing unit 12 are synthesized with the synthesizing unit 14.

With the constitution of the twelfth embodiment, as a result of performing color adjustment to the overall image upon detecting the ratio of the RGB signal after the synthesis of the plurality of cutout images, color control of the respective cutout images may be omitted, thereby realizing a low cost constitution.

The present invention, in addition to the image processing device in image pickup devices employing solid-state image pickup elements such as digital cameras and digital video cameras, may be applied to image processing devices in medical image pickup devices such as electronic endoscopes.

The constitution and effect of the foregoing embodiments are now explained.

The image processing device according to an embodiment of the present invention has division area setting means for dividing and cutting out a plurality of image areas from a single image; and synthesizing means for synthesizing into a single image the plurality of image areas divided and cut out with the division area setting means.

According to the foregoing constitution, by cutting out several arbitrary image areas from the same image output of a single camera and synthesizing and outputting the cutout portion, the problems to adjust color, brightness and geometric variations that arise among cameras in a case where several cameras are used will not occur. This is because the cutout images are acquired with the same image pickup element, and variations among cameras will not occur. There is also an advantage in that this is much more cost effective in comparison to a case of using a plurality of cameras.

Further, in the image processing device according to an embodiment of the present invention, it is desirable for further comprising image processing means for performing individual image processing on the plurality of image areas divided and cut out with the division area setting means, wherein the images subjected to individual image processing are synthesized into a single image with the synthesizing means.

According to the foregoing constitution, it is proposed to perform individual image processing on the cutout images so that the cutout images will become appropriate. When using a plurality of cameras, although it is possible to adjust the brightness, color and so on of the respective cameras, when cutting out a plurality of images from a single camera, the brightness, color and so on are determined such that the overall image will become appropriate. Thus, the brightness, color and so on of the cutout images will not always become appropriate. Therefore, after processing the overall image, the cutout images can be made appropriate by individually adjusting the respective cutout images.

Moreover, in the image processing device according to an embodiment of the present invention, it is desirable to further comprise a display device for displaying the image synthesized with the synthesizing means, wherein the individual image processing of the plurality of divided and cut out image areas is resolution conversion for converting the resolution of the cutout images into a resolution for display on the display device.

According to the foregoing constitution, upon synthesizing and displaying the cutout images on the display device, the resolution of the cutout images can be converted into the resolution conforming to the size upon displaying such cutout images on the display device. In other words, the cutout images are subjected to individual resolution conversion so as to make the individual cutout images of an appropriate display resolution. When synthesizing and displaying the cutout images on the screen of the display device, since the respective cutout images will be enlarged or reduced to a predetermined size on a predetermined area, for instance, on the screen of the display device, by performing further smoothing processing through the comparison of the resolution of the cutout image and the resolution of the display image thereof and enlargement or reduction of the image by performing resolution conversion in accordance with the ratio thereof, it is possible to prevent the cutout image from becoming more grainy.

In addition, in the image processing device according to an embodiment of the present invention, it is desirable that the individual image processing of the image processing means is brightness correction.

According to the foregoing constitution, in order to make the brightness of the cutout images appropriate, by adjusting the individual levels of the respective cutout images after performing exposure correction (AE) to the overall image, brightness of the respective cutout images on the synthesized screen will become appropriate. This exposure correction (AE) and level adjustment may be pursuant to a conventional method; for instance, with the "average photometry" method, AE may be performed by integrating the brightness value of the overall screen and adjusting the iris, or adjusting the electronic shutter speed of the image pickup element. Level adjustment may be conducted by integrating the brightness value of the overall screen and then adjusting the gain of the amplifier inside so as to attain a constant. Further, "center weighted photometry" may be conducted by integrating the brightness value by laying emphasis on the data at the center in relation to the periphery, and performing AE and level adjustment based on such integrated value. Therefore, regarding the brightness correction of the individual cutout images, iris adjustment, speed adjustment of the electronic shutter of the image pickup element, and gain adjustment of the amplifier may be conducted in combination, or the amplifier gain adjustment may be conducted independently.

Further, in the image processing device according to an embodiment of the present invention, it is desirable that the individual image processing of the image processing means is color correction.

According to the foregoing constitution, in order to make the color of the cutout images appropriate, by adjusting the individual levels of the respective cutout images after performing color correction (white balance adjustment for example) to the overall image, color of the respective cutout images on the synthesized screen will become appropriate. The method of color correction may be a conventional method; that is, processing of integrating the overall screen (in the case of a cutout image, the overall screen of such cutout image) such that the RGB will become constant, integrating the portion of low saturation upon excluding the large colored sections within the screen (for instance, in the case of a subject where most of the screen is leaves and there is a ground in the periphery, the leaves are deleted, and color balance is calculated with only the color data of the ground) such that the RGB will become constant, and so on.

Moreover, in the image processing device according to an embodiment of the present invention, it is desirable that the individual image processing of the image processing means is processing for changing the outline correction amount in proportion to the enlargement ratio of the resolution of the display image of the display device in relation to the resolution of the plurality of divided and cut out image areas.

According to the foregoing constitution, since the ratio of the cutout size of a certain cutout image and the output size of the synthesized image regarding such size of the cutout image will differ based on the individual cutout image, by performing appropriate outline correction, it is possible to reduce the deterioration in the picture quality of the synthesized image. In other words, when the output size in a synthesized image is enlarged regarding the size of a certain cutout image, since the number of pixels will be increased with pixel interpolation when there are not enough pixels necessary for such enlargement of the picked-up pixels, the outline of the displayed image will be made blurry to that extent. Thus, the outline correction amount is increased. Further, when the enlargement rate is lowered or the image in the synthesized screen is reduced, the outline correction amount is reduced, or the outline correction is not performed.

In addition, in the image processing device according to an embodiment of the present invention, it is desirable that the individual image processing of the image processing means is correction with the electronic shutter of the image pickup element.

According to the foregoing constitution, when using an image pickup element capable of outputting a plurality of arbitrary areas, as a result of detecting the brightness level for each cutout processing area and designating the shutter speed (or storage time), the brightness of the respective cutout images on the synthesized screen can be made appropriate. For example, an 8 million pixel image pickup element may be divided into four areas each of 2 million pixels to control the shutter speed (or storage time), and, when it is constituted to abstract cutout images respectively from the four areas, as a result of detecting the brightness level per cutout processing area and appropriately designating the shutter speed (or storage time), the brightness of the respective cutout images on the synthesized screen can be made appropriate.

Further, in the image processing device according to an embodiment of the present invention, it is desirable to provide frame buffer means for outputting the plurality of divided and cut out images at a speed corresponding to the size of the individual cutout images.

According to the foregoing constitution, as a result of focusing on the fact that the readout speed of the image pickup element for a single image differs depending on the cutout image of the image pickup element, frame buffer memory means has been provided. As a result, even when using an image pickup element with low processing performance of the readout rate below the motion image rate (readout of 30 frames per second) for reading out all pixels, the readout rate can be sped up for cutout images having a relatively narrow area (i.e., images of a small size) and displayed as motion image.

Moreover, the image processing device according to an embodiment of the present invention has division area setting means for dividing and cutting out a plurality of image areas from a single image; reference area setting means for setting one image area among the plurality of image areas divided and cut out with the division area setting means as a single reference area; parameter setting means for correcting and determining the parameter for performing processing on the plurality of image areas divided and cut out with the division area setting means in relation to the parameter to be used in the processing to be performed to the reference area based on the difference between the reference area and the plurality of divided and cut out image areas other than the reference area; synthesizing means for performing processing on the reference area and the plurality of divided and cut out image areas other than the reference area with the parameter set with the parameter setting means, and synthesizing the images of the respective areas into a single image; and a display unit for displaying an image synthesized with the synthesizing means.

According to the foregoing constitution, the cutout image to be the reference and other cutout images are selected, such reference image and the other cutout images are relatively compared, and the reference image and other cutout images are corrected based on such difference. Thus, an image that will not give any sense of discomfort to the observer can be provided as the synthesized image.

In addition, in the image processing device according to an embodiment of the present invention, it is desirable that the processing with the parameter is brightness correction processing to be performed to the plurality of divided and cut out image areas for relatively correcting the brightness level of the divided and cut out image areas other than the reference area based on the brightness level of the reference area.

According to the foregoing constitution, means is provided for determining the brightness level (exposure) from the average brightness, center weighted photometry or spot photometry data of the reference area image, and accommodating the data to all cutout images. It is therefore possible to match the brightness of the cutout image to be focused on the most.

The brightness of the cutout images other than the reference area, in addition to being the same as the brightness of the reference area, may be determined with the arithmetic mean value of the brightness level of the overall image and the brightness level of the reference area, or the arithmetic addition mean value of the brightness level of the cutout image and the brightness level of the reference area, or based on (average brightness level of reference area+average brightness level of overall image+brightness level of respective cutout images) divided by three.

This method of matching the brightness may be pursuant to a conventional method; for instance, with the "average photometry" method, by integrating the brightness value of the overall screen (in the case of a cutout image, the overall screen of such cutout image), adjusting the iris, adjusting the electronic shutter speed of the image pickup element, and adjusting the gain of the amplifier are performed individually or in combination. Further, "center weighted photometry" may be conducted by integrating the brightness value by laying emphasis on the data at the center in relation to the periphery, and performing level adjustment based on such integrated value.

Further, in the image processing device according to an embodiment of the present invention, it is desirable to further comprise a first resolution conversion unit for converting the resolution of the plurality of divided and cut out images into a predetermined resolution; selection means for selecting one of the plurality of divided and cut out images in which the resolution thereof is converted with the first resolution conversion unit; transmission means for transmitting the plurality of divided and cut out images selected with the selection means; a second resolution conversion unit for converting the resolution of the plurality of divided and cut out images transmitted with the transmission means into a predetermined resolution; and buffer memory means for converting the plurality of divided and cut out images in which the resolution thereof is converted with the second resolution conversion unit into the frame rate of the display device for displaying the synthesized image; wherein the images of the reference area of the plurality of divided and cut out images are transmitted more than the images of areas other than the reference area.

According to the foregoing constitution, this invention aims to display the reference area to be focused on at a motion image level in comparison to the other areas in a state where the communication speed (data rate) is rate controlled. The respective cutout images are foremost subjected to resolution conversion such that they can be transmitted at 30 frames per second (or 60 frames), and, after making such images an image size of 30 frames (VGA size for example), as a result of selecting and transmitting the reference cutout image more often than the other cutout image, even if the communication data rate is relatively slow, the overall synthesized image will not drop frames, and it will thereby be possible to display the reference image in quasi motion image and the other image as an image with dropped frames.

Moreover, in the image processing device according to an embodiment of the present invention, it is desirable to further comprise correction means for correcting the level of the image synthesized with the synthesizing means based on a predetermined parameter.

According to the foregoing constitution, correction is performed for making the average value of the overall screen to become appropriate after synthesizing the cutout image into a single image. Since the level adjustment is not conducted individually, if the level difference among the cutout images is relatively small, there is a merit of realizing low costs as with the invention of claim 1. Further, since this will enable correction close to the adequate value of the screen that is cut out relatively large, the image to be focused on and having a large output area will be of an approximately adequate level.

In addition, in the image processing device according to an embodiment of the present invention, it is desirable that the correction means corrects the brightness level of the synthesized image.

According to the foregoing constitution, since correction is performed for making the average brightness of the overall screen to become appropriate after synthesizing the cutout images into a single image, brightness adjustment of the respective cutout images may be omitted, and a low cost constitution is thereby possible.

Further, in the image processing device according to an embodiment of the present invention, it is desirable that the correction means corrects the color balance of the synthesized image.

According to the foregoing constitution, since color correction is performed to the overall screen after synthesizing the cutout images into a single image, color adjustment of the respective cutout images may be omitted, and a low cost constitution is thereby possible. Further, this will enable correction close to the adequate value of the screen that is cut out relatively large.

Moreover, in the image processing device according to an embodiment of the present invention, it is desirable that the division area setting means has overall image display means for displaying the overall original image prior to being divided, and division cutout position designation means for designating the area for dividing and cutting out the image on the overall image display means, whereby the division cutout position designation means determines the position for dividing and cutting out the image by designating a portion of the image displayed on the overall image display means.

According to the foregoing constitution, proposed is means for the user to set the cutout image to the overall image display means. Extraction of the cutout image is conducted by pressing the button of the mouse at the starting point, and releasing it at the ending point.

In addition, in the image processing device according to an embodiment of the present invention, it is desirable to further comprise synthesized image display means for displaying the synthesized image synthesized with the synthesizing means; and image size designation means for designating the size of the respective images upon synthesizing and displaying the plurality of cutout images so as to correspond to the image size of the synthesized image display means.

According to the foregoing constitution, proposed is means for the user to set the displayed area to the synthesized image display means. As with the extraction of the cutout area, the display area can similarly be extracted by pressing the button on the mouse at the starting point and then releasing the button at the ending point. Incidentally, the display area may or may not overlap with a part of or the entire cutout image. In order to avoid overlapping, the setting may be made such that the display area which has been first determined cannot be designated with any subsequent operations by making the mouse button inoperable when it is pressed in such area.

Further, in the image processing device according to an embodiment of the present invention, it is desirable to further comprise synthesized image display means for displaying the synthesized image synthesized with the synthesizing means; and size determination means for determining the size of the respective images so as to obtain a single synthesized image without any gap when arranging the respective images upon synthesizing and displaying the plurality of cutout images according to the image aspect ratio of the synthesized image display means.

According to the foregoing constitution, proposed is means for the user to set a display area on the synthesized image display means. A display without any gaps can be easily set by arranging the display areas to be set in the synthesized image display means without any gaps and predetermining the size of the respective displayed images such that a single synthesized image may be obtained.

Moreover, in the image processing device according to an embodiment of the present invention, it is desirable to further comprise synthesized image display means for displaying the synthesized image synthesized with the synthesizing means; and aspect ratio designation means for designating the combination of the aspect ratio of the respective images to be divided and displayed on the synthesized image display means.

According to the foregoing constitution, proposed is means for the user to easily set the cutout image and display area of the display means by allowing the user to select the display pattern to be displayed on the synthesized image display means. Several display patterns are prepared as shown in FIG. 3 to FIG. 5, and the user foremost selects a display pattern. Then, in the respective display areas constituting the selected display pattern, the cutout method is restricted to setting the cutout area in an aspect ratio that is the same as the aspect ratio of the display setting, and a display screen without any gaps on the synthesized image display means becomes possible.

As described above, according to the foregoing embodiments of the present invention, it is possible to realize an image processing device capable of making the respective images that are cut out, synthesized and displayed to become an appropriate brightness, color, geometric adjustment and the like, in case the overall image of an adequate exposure (brightness and color are adequate), upon cutting out, synthesizing and displaying a plurality of image areas from a single image.

The invention being thus described, it will be obvious that the same may be varied in many ways. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. An image processing device, comprising:
a division area setting unit for dividing and cutting out at least one of a plurality of image areas from a single original image; and
a synthesizing unit for synthesizing into a single synthesized image the plurality of image areas divided and cut out with the division area setting unit, wherein the at least one of the divided and cut out image areas occupies a new location in the synthesized image which is different from an original location occupied by said at least one of the divided and cut out image areas in the original image.

2. An image processing device, comprising:
a division area setting unit for dividing and cutting out a plurality of image areas from a single image;
a synthesizing unit for synthesizing into a single image the plurality of image areas divided and cut out with the division area setting unit;
an image Processing unit for performing individual image processing on the plurality of image areas divided and cut out with the division area setting unit, wherein the images subjected to individual image processing are synthesized into a single image with the synthesizing unit;
a display device for displaying the image synthesized with the synthesizing unit, wherein the individual image processing of the plurality of divided and cut out image areas comprises resolution conversion for converting a resolution of the cutout images into a the resolution for display on the display device; and
wherein the individual image processing of the image processing unit comprises processing for changing an outline correction amount in proportion to an enlargement ratio of a resolution of the display image of the display device in relation to the resolution of the plurality of divided and cut out image areas.

3. An image processing device according to claim 2, wherein a frame buffer is provided for outputting each divided and cut out image at a speed corresponding to a size of each individual cutout image.

4. An image processing device, comprising:
a division area setting unit for dividing and cutting out a plurality of image areas from a single image;
a reference area setting unit for setting one image area among the plurality of image areas divided and cut out with the division area setting unit as a single reference area;
a parameter setting unit for correcting and determining the parameter for performing processing on the plurality of images divided and cut out with the division area setting unit in relation to the parameter to be used in the processing for the reference area based on a difference between the reference area and a plurality of divided and cut out image areas other than the reference area;
a synthesizing unit for performing processing on the reference area and the plurality of divided and cut out image areas other than the reference area with a parameter set in the parameter setting unit, and synthesizing the images of the respective areas into a single image; and
a display unit for displaying an image synthesized with the synthesizing unit.

5. An image processing device according to claim 4, wherein the processing with the parameter is brightness correction processing to be performed on the divided and cut out image areas for adjusting a brightness level of the divided and cut out image areas other than the reference area based on a brightness level of the reference area.

6. An image processing device, comprising:
a division area setting unit for dividing and cutting out a plurality of image areas from a single image; and
a synthesizing unit for synthesizing into a single image the plurality of image areas divided and cut out with the division area setting unit;
a first resolution conversion unit for converting the resolution of the plurality of divided and cut out images to a predetermined resolution;
a selection unit for selecting one of the plurality of divided and cut out images in which the resolution thereof is converted with the first resolution conversion unit;
a transmission unit for transmitting the plurality of divided and cut out images selected with the selection unit;
a second resolution conversion unit for converting the resolution of the plurality of divided and cut out images transmitted with the transmission unit into a predetermined resolution; and
a buffer memory for converting the plurality of divided and cut out images in which the resolution thereof is converted with the second resolution conversion unit into the frame rate of the display device for displaying the synthesized image;
wherein the images of the reference area of the plurality of divided and cut out images are transmitted more than the images of areas other than the reference area.

7. An image processing device, comprising:
a division area setting unit for dividing and cutting out a plurality of image areas from a single image;
a synthesizing unit for synthesizing into a single image the plurality of image areas divided and cut out with the division area setting unit; and
further comprising a synthesized image display unit for displaying a synthesized image synthesized with the synthesizing unit; and an image size designation unit for designating a size of the respective images upon synthesizing and displaying the plurality of cutout images so as to correspond to an image size of the synthesized image display unit.

8. An image processing device, comprising:
a division area setting unit for dividing and cutting out a plurality of image areas from a single image;
a synthesizing unit for synthesizing into a single image the plurality of image areas divided and cut out with the division area setting unit; and
further comprising a synthesized image display unit for displaying a synthesized image synthesized with the synthesizing unit; and a size determination unit for determining a size of each cut out image so as to obtain a single synthesized image without any gap when arranging the cut out images upon synthesizing and displaying the plurality of cutout images according to an image aspect ratio of the synthesized image display unit.

9. An image processing device, comprising:
a division area setting unit for dividing and cutting out a plurality of image areas from a single image;
a synthesizing unit for synthesizing into a single image the plurality of image areas divided and cut out with the division area setting unit; and
further comprising a synthesized image display unit for displaying the synthesized image synthesized with the synthesizing unit; and an aspect ratio designation unit for designating the combination of the aspect ratio of the respective images to be divided and displayed on the synthesized image display unit.

10. An image processing image, comprising:
a division area setting unit for dividing and cutting out a plurality of image areas from a single image;
an image processing unit for performing individual image processing on the plurality of image areas divided and cut out by the division area setting unit; and
a synthesizing unit for synthesizing into a single image the plurality of image areas subjected to individual image processing with the image processing unit;
wherein the division area setting unit has a division cutout position designation unit for designating an area for dividing and cutting out the image on an overall image display unit for displaying the overall original image prior to being divided, whereby the division cutout position designation unit determines a position for each divided and cut out image by designating a portion of the image displayed on the overall image display unit.

11. An image processing device according to claim 10 further comprising a display unit for displaying the synthesized image synthesized with the synthesizing unit; wherein the individual image processing of the plurality of divided and cut out image areas comprises a resolution converter for converting a resolution of the cutout images into a resolution for display on the display device.

12. A computer-readable medium for storing routines executed by a computer, comprising:
a routine for dividing and cutting out at least one of a plurality of image areas from an original image; and
a routine for forming a second composite image incorporating the at least one of a plurality of image areas divided and cutout from said original image in such a manner that the image area divided and cutout occupies a new location in the composite image that is different from a location of the at least one of plurality of image areas in the original image.

13. The computer-readable medium of claim 12 wherein the routine for dividing and cutting out at least one of a plurality of image areas from an original image further includes a routine for providing an image portion which is of a size which differs from a size of the image portion in the cutout image area of the original image.

* * * * *

UNITED STATES PATENT AND TRADEMARK OFFICE
CERTIFICATE OF CORRECTION

PATENT NO.        : 7,415,166 B2  
APPLICATION NO.   : 10/980460  
DATED             : August 19, 2008  
INVENTOR(S)       : Akihiro Kubota Page 1 of 1

It is certified that error appears in the above-identified patent and that said Letters Patent is hereby corrected as shown below:

At claim 2, column 25, line 52, after the words "an image", delete "Processing", and insert therefor --processing--.

Signed and Sealed this

Thirteenth Day of January, 2009

JON W. DUDAS  
*Director of the United States Patent and Trademark Office*

UNITED STATES PATENT AND TRADEMARK OFFICE
CERTIFICATE OF CORRECTION

| | | |
|---|---|---|
| PATENT NO. | : 7,415,166 B2 | Page 1 of 1 |
| APPLICATION NO. | : 10/980460 | |
| DATED | : August 19, 2008 | |
| INVENTOR(S) | : Akihiro Kubota | |

It is certified that error appears in the above-identified patent and that said Letters Patent is hereby corrected as shown below:

IN THE SPECIFICATION

At column 11, line 39, after the words "three frame memories 101b, 101c and", delete "110d" and insert therefor -- 101d --.

Signed and Sealed this

Nineteenth Day of May, 2009

JOHN DOLL
*Acting Director of the United States Patent and Trademark Office*